US012561445B2

(12) United States Patent
Aloraini et al.

(10) Patent No.: US 12,561,445 B2
(45) Date of Patent: Feb. 24, 2026

(54) EVALUATION OF A PRIVACY INCIDENT RISK IN COMPUTER CODE

(71) Applicant: Microsoft Technology Licensing, LLC, Redmond, WA (US)

(72) Inventors: Bushra Sulaiman Aloraini, Vancouver (CA); John Stewart Siy Chu, Vancouver (CA); Calvin Lii, Vancouver (CA); Richard Chiang, Vancouver (CA); Vihang Yogesh Godbole, Vancouver (CA); James George Haslam, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 187 days.

(21) Appl. No.: 18/340,563

(22) Filed: Jun. 23, 2023

(65) Prior Publication Data

US 2024/0427900 A1 Dec. 26, 2024

(51) Int. Cl.
G06F 21/57 (2013.01)

(52) U.S. Cl.
CPC ...... G06F 21/577 (2013.01); G06F 2221/033 (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 10,515,212 B1 | 12/2019 | Mcclintock | |
| 11,630,919 B1 * | 4/2023 | Tripp ........................ | G06F 8/75 |
| | | | 713/189 |
| 2013/0185804 A1 * | 7/2013 | Biswas ................. | G06F 21/577 |
| | | | 726/26 |
| 2020/0379879 A1 * | 12/2020 | Plotnik .................. | B62H 5/142 |
| 2020/0394313 A1 | 12/2020 | Ionescu | |
| 2021/0312082 A1 | 10/2021 | Conikee | |

OTHER PUBLICATIONS

Rahman, Akond, et al., Predicting Android Application Security and Privacy Risk With Static Code Metrics, IEEE/ACM 4th International Conference on Mobile Software Engineering and Systems (MOBILESoft), 2017, 5 pages, [retrieved on May 12, 25], Retrieved from the Internet: <URL:http://ieeexplore.ieee.org/>.*

(Continued)

*Primary Examiner* — Geoffrey R St Leger
(74) *Attorney, Agent, or Firm* — Weaver IP L.L.C.

(57) ABSTRACT

Privacy incidence evaluation systems and methods are disclosed herein. A code changeset is retrieved that identifies a change from a prior version of a code. A tokenization score is determined from keywords present in the code changeset, where the tokenization score is indicative of a presence of a privacy term in the code changeset. A historical score is determined based on a set of computer code stored in a code repository. A privacy risk score is generated from the tokenization score and the historical score, where the privacy risk score indicates a likelihood that the code changeset, if implemented, would result in an occurrence of a privacy incident (e.g., an unintended leak of private data). An action is performed based on the privacy risk score to mitigate a risk of a privacy incident occurrence.

20 Claims, 6 Drawing Sheets

(56)                    References Cited

OTHER PUBLICATIONS

Andrade, Rodrigo, Privacy and Security Constraints for Code Contributions, Companion Proceedings of the 2015 ACM SIGPLAN International Conference on Systems, Programming, Languages and Applications: Software for Humanity, 2015, 3 pages, [retrieved on May 14, 2025], Retrieved from the Internet: < URL:http://dl.acm.org/>.*

International Search Report and Written Opinion received for PCT Application No. PCT/US2024/034564, Aug. 13, 2024, 11 pages.

Aloraini, et al., "An Empirical Study of Security Warnings from Static Application Security Testing Tools", In Journal of Systems and Software, vol. 158, Dec. 1, 2019, 25 Pages.

Cheng, et al., "Enterprise Data Breach: Causes, Challenges, Prevention, and Future Directions", In Journal of Wiley Interdisciplinary Reviews: Data Mining and Knowledge Discovery, vol. 7, Issue 5, Sep. 2017, 14 Pages.

Cotroneo, et al., "How Bad Can a Bug Get? An Empirical Analysis of Software Failures in the OpenStack Cloud Computing Platform", In Proceedings of 27th ACM Joint Meeting on European Software Engineering Conference and Symposium on the Foundations of Software Engineering, Aug. 12, 2019, pp. 200-211.

Kim, et al., "Properties of Signature Change Patterns", In Proceedings of 22nd IEEE International Conference on Software Maintenance, Sep. 24, 2006, 10 Pages.

Priebe, et al., "Cloudsafetynet: Detecting Data IEakage between Cloud Tenants", In Proceedings of the 6th edition of the ACM Workshop on Cloud Computing Security, Nov. 2014, pp. 117-128.

Rahman, "The Seven Sins: Security Smells in Infrastructure as Code Scripts", In Proceedings of IEEE/ACM 41st International Conference on Software Engineering (ICSE), May 25, 2019, pp. 164-175.

Shu, et al., "Privacy-Preserving Detection of Sensitive Data Exposure", In Journal of IEEE Transactions on Information Forensics and Security, vol. 10, Issue 5, May 2015, pp. 1092-1103.

Sliwerski, et al., "When Do Changes Induce Fixes?", In ACM sigsoft software engineering notes, May 17, 2005, 5 Pages.

Williams, et al., "Szz revisited: Verifying when Changes Induce Fixes", In Proceedings of the Workshop on Defects in Large Software Systems, Jul. 20, 2008, pp. 32-36.

Yin, et al., "How Do Fixes Become Bugs?", In Proceedings of ACM SIGSOFT European Conference on Foundations of Software Engineering, Sep. 5, 2011, 11 Pages.

International Preliminary Report on Patentability (Chapter I) received for PCT Application No. PCT/US2024/034564, Jan. 2, 2026, 06 pages.

* cited by examiner

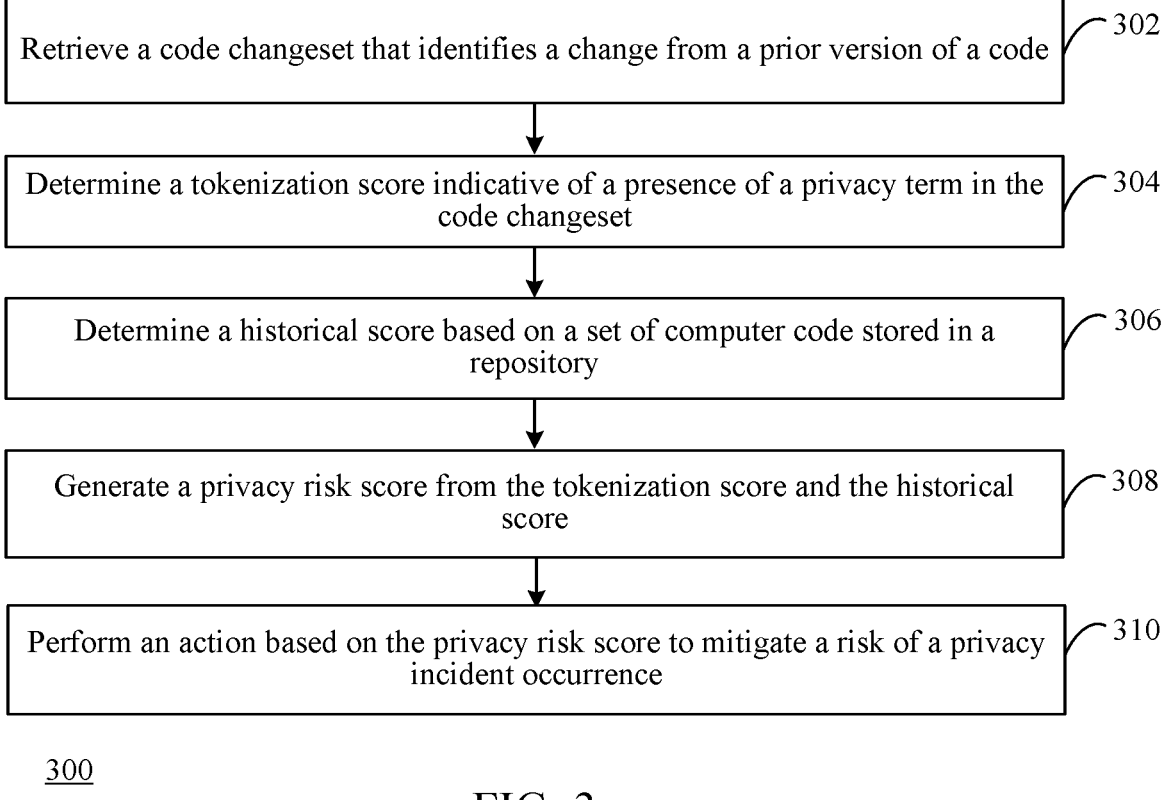

Retrieve a code changeset that identifies a change from a prior version of a code ⌐302

Determine a tokenization score indicative of a presence of a privacy term in the code changeset ⌐304

Determine a historical score based on a set of computer code stored in a repository ⌐306

Generate a privacy risk score from the tokenization score and the historical score ⌐308

Perform an action based on the privacy risk score to mitigate a risk of a privacy incident occurrence ⌐310

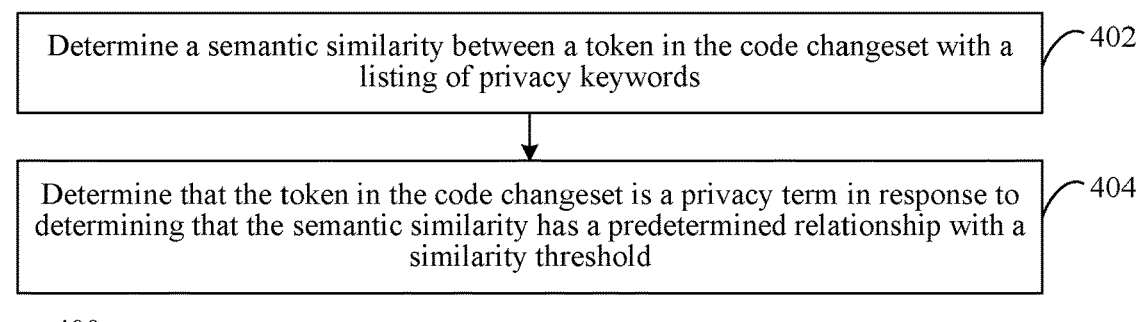

| Determine a semantic similarity between a token in the code changeset with a listing of privacy keywords | 402 |

| Determine that the token in the code changeset is a privacy term in response to determining that the semantic similarity has a predetermined relationship with a similarity threshold | 404 |

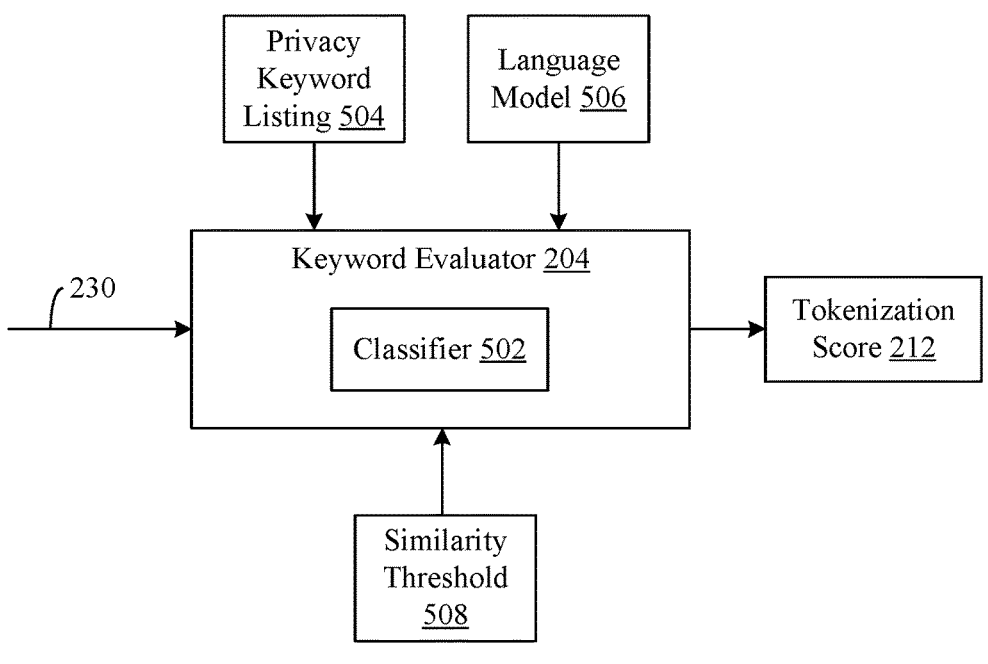

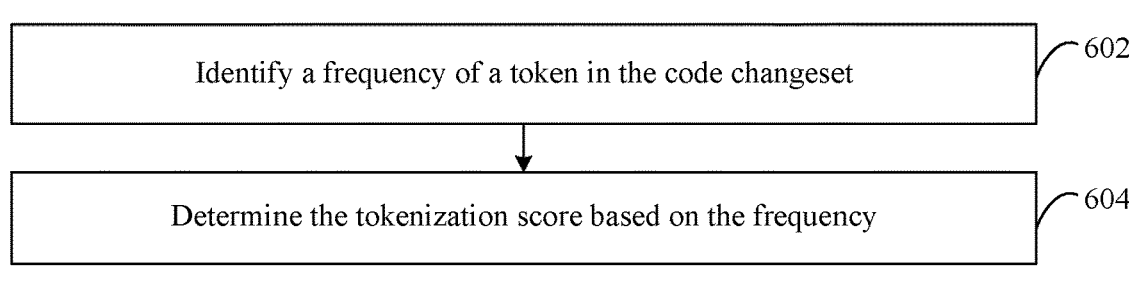

| Identify a frequency of a token in the code changeset | 602 |

| Determine the tokenization score based on the frequency | 604 |

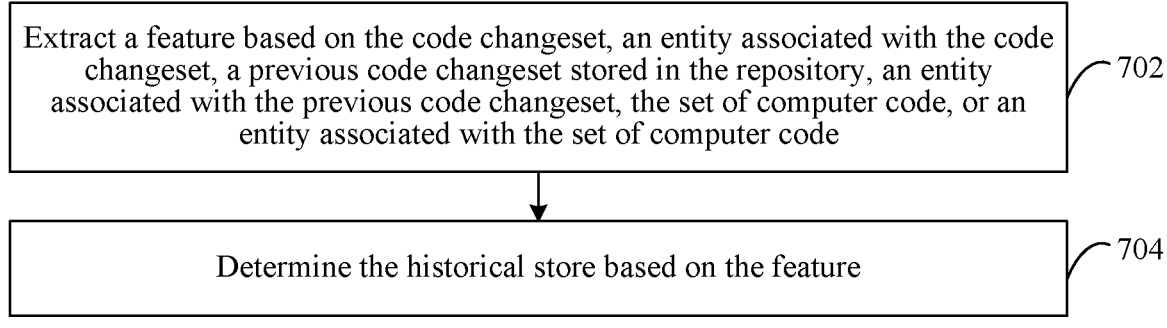

Extract a feature based on the code changeset, an entity associated with the code changeset, a previous code changeset stored in the repository, an entity associated with the previous code changeset, the set of computer code, or an entity associated with the set of computer code ⌐ 702

Determine the historical store based on the feature ⌐ 704

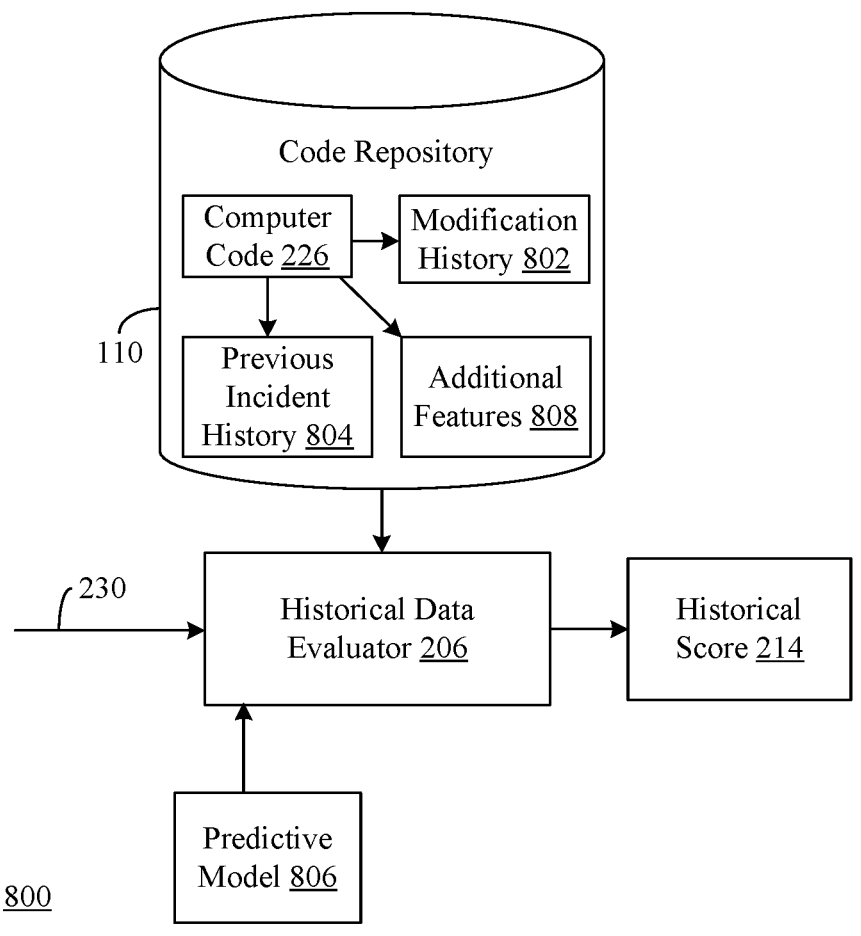

Code Repository

Computer Code 226 → Modification History 802

Previous Incident History 804

Additional Features 808

110

230 → Historical Data Evaluator 206 → Historical Score 214

Predictive Model 806

EVALUATION OF A PRIVACY INCIDENT RISK IN COMPUTER CODE

BACKGROUND

A privacy data leak involves a disclosure of sensitive data to unauthorized entities Such sensitive information can include personal identifiable information (PII), credentials (e.g., usernames, passwords, etc.), healthcare information, financial information, or other types of data that is not otherwise intended for public dissemination. In many instances, the root cause of a privacy incident can be traced back to a software mistake, flaw, or human error that resulted in a security vulnerability. For instance, a software bug may allow one entity to accidentally or deliberately access another entity's private data due to the presence of a software bug.

Traditional tools rely on an analysis of software code using pattern matching based on pre-defined rules or an analysis of telemetry produced by software. However, these techniques are limited in their scope and are far from optimal to detect privacy data leaks. When a privacy data leak occurs, remediation can be costly for all parties involved, including customers, clients, and vendors. Additionally, data leaks can have various other impacts, such as affecting customer, client, and/or vendor relationships, among other potential issues.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are disclosed herein for evaluating a privacy incidence risk. In an example system, a code changeset is retrieved that identifies a change from a prior version of a code. A tokenization score is determined that is indicative of a presence of privacy-related terms in the code changeset. A historical score is determined based on a set of computer code (e.g., code other than the code changeset) that is stored in a code repository. The historical score is determined based on any number of predictors (e.g., previously observed behaviors correlated with privacy incidents). A privacy risk score is generated from the tokenization score and the historical score. An action is performed based on the privacy risk score to mitigate a risk of a privacy incident occurrence.

Accordingly, example embodiments are directed to techniques for monitoring code changes (e.g., software changes within pull requests) by applying a text-based approach combined with data mining to calculate a risk score that predict the possibility of a data leak. As a result, code (which may contain software bugs) that can potentially result in a future privacy leak can be detected and/or prevented from being implemented at the development stage. For instance, a developer may review the risk score and information associated therewith, and take one or more remediation actions (e.g., further code changes) to address the potential privacy leak issues before committing the code.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart of a method for evaluating a privacy incident risk, in accordance with an example embodiment.

FIG. 4 shows a flowchart of a method for determining a tokenization score, in accordance with an example embodiment.

FIG. 5 shows a block diagram of a system for determining a tokenization score, in accordance with an embodiment.

FIG. 6 shows a flowchart of a method for determining a tokenization score based on a frequency of a word, in accordance with an example embodiment.

FIG. 7 shows a flowchart of a method for determining a historical score based on an extracted feature, in accordance with an example embodiment.

FIG. 8 shows a block diagram of a system for determining a historical score, in accordance with an example embodiment.

Figure 1:
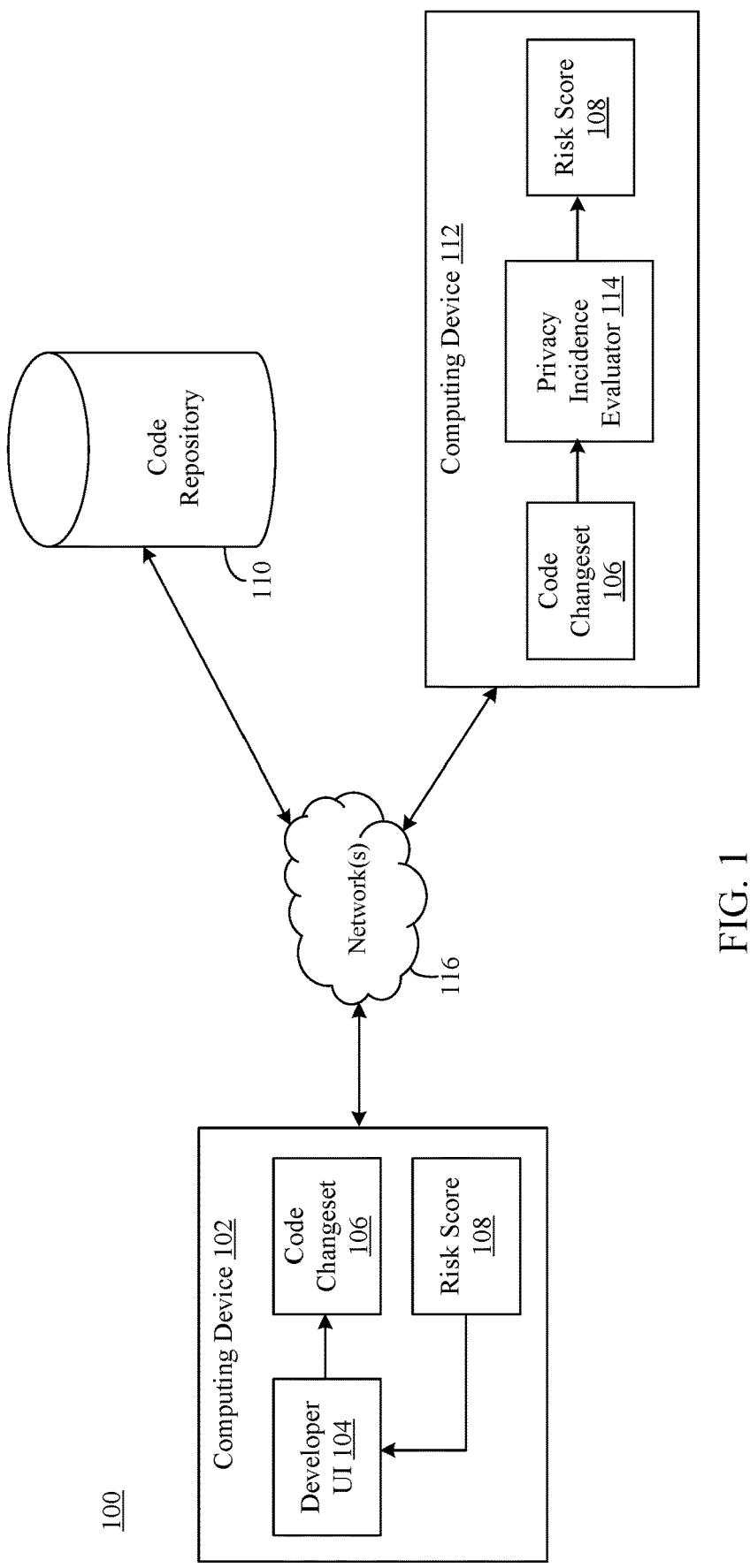
FIG. 1 shows a block diagram of a privacy risk evaluation system, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A privacy data leak involves a disclosure of sensitive data to unauthorized entities Such sensitive information can include PII, credentials (e.g., usernames, passwords, etc.), healthcare information, financial information, or other types of data that is not otherwise intended for public dissemination. In many instances, the root cause of a privacy incident can be traced back to a software mistake, flaw, or human error that resulted in a security vulnerability. For instance, a software bug may allow one entity to accidentally or deliberately access another entity's private data due to the presence of a software bug.

Traditional tools comprise static and dynamic analysis detection techniques to detect vulnerabilities that could lead to privacy data leaks. Static analysis techniques typically rely on analyzing an entire software's code using rules for pattern matching to identify the presence of known types of vulnerabilities in the code. However, given that such tools require the rules to be pre-defined by a user, static analysis can result in noisy results (e.g., many false positive results) and/or missed vulnerabilities (e.g., due to uniqueness in a set of code that was not covered by a static analysis rule, code being written in a language that is not covered by a static analysis rule, etc.). Dynamic analysis techniques, on the other hand, evaluates software based on telemetry (e.g., logs or other data) that the software is producing or outputting. Dynamic analysis, however, is resource-intensive and does not analyze the source code itself. In addition, dynamic analysis techniques occur after the software has begun executing. While dynamic analysis can be performed based on executing the software in a test environment, the telemetry that is produced in a test environment is not representative of telemetry produced in a production environment, as test cases need to be defined manually and are not comprehensive enough cover unpredictable scenarios. In a real-world production environment, a privacy data leak may have already occurred by the time it is detected by a dynamic analysis tool.

In addition, software products are growing and increasing in size, as many functionalities, features, and dependencies are added over time. This increased complexity makes traditional detection methods inadequate in terms of scalability. Still further, some data leak bugs are a by-product of multitenant architecture and associated processes, such as resource sharing and/or large-scale access control, which can be difficult to detect using existing tools. In other instances, it is not software artifacts that indirectly lead to a privacy risk but rather human behaviors (e.g., misunderstanding, miscommunication, etc.), which cannot be detectable in existing systems. Further, even where patterns are relied upon for detection, unfamiliar data leak bug patterns can take time to identify (which can occur on a regular basis). As a result, conventional detection solutions are far from optimal to detect privacy data leaks for various reasons.

When a privacy data leak occurs, remediation can be costly for all parties involved, including customers, clients, and vendors. Additionally, data leaks can have various other impacts, such as affecting customer, client, and/or vendor relationships, among other potential issues.

Embodiments described herein are directed to evaluating a privacy incidence risk by generating a privacy risk score. In an example system, a code changeset is retrieved that identifies a change from a prior version of a code. A tokenization score is determined that is indicative of a presence of a privacy term in the code changeset, such as a token that relates to code functionality that potentially affects the manner in which private information is retrieved, accessed, stored, or maintained. A historical score is determined based on a set of computer code (e.g., code other than the code changeset) that is stored in a code repository. In disclosed embodiments, the historical score is determined based on behaviors correlated with prior privacy incidents. A privacy risk score is generated from the tokenization score and the historical score. An action is performed based on the privacy risk score to mitigate a risk of a privacy incident occurrence.

Accordingly, example embodiments are directed to techniques for monitoring code changes (e.g., software changes within pull requests) by applying a text-based approach combined with data mining to calculate a risk score that predict the possibility of a data leak. As a result, code (which may contain software bugs) that can potentially result in a future privacy leak can be detected and/or prevented from being implemented at the development stage. For instance, a developer may review the risk score and information associated therewith, and take one or more remediation actions (e.g., further code changes) to address the potential privacy leak issues before committing the code.

Example embodiments described herein advantageously provide improvements in various areas of computing, including but not limited to, improvements in the utilization of computing resources and improvements to data security. For instance, by analyzing characteristics associated with a code changeset (e.g., in a pull request) and/or data stored in a code repository, a smaller set of code is analyzed compared to conventional techniques that require analysis of a full software program or rely on an analysis of telemetry produced by software code. In other words, example techniques described herein are lightweight compared to conventional methods, given that changesets of code often introduce bugs. As a result, disclosed techniques allow for improved utilization of computing resources (e.g., reduction in processing cycles) compared to existing techniques in identifying potential privacy risks in software.

Furthermore, examples techniques described herein allow for detection of a software bug that can result in a privacy leak prior to releasing or shipping the software, which allows for a minimal (if any) reliance on dynamic analysis techniques that utilize vast amounts of computing resources (processor resources, memory/storage resources, network resources). Thus, by reducing the reliance on dynamic analysis techniques to detect privacy leaks (or potential privacy leaks) caused by software code flaws, further improvements to the utilization of computing resources can be achieved.

Still further, by identifying and/or enabling the remediation of software bugs that can result in data leaks early (e.g., before software is released), access of sensitive information in computing system by unauthorized entities (e.g., malicious actors) can be prevented, thereby maintaining the security of data stored and/or accessed by various systems coupled to a network. Furthermore, identifying such software bugs early to minimize data leaks, unintended network-based access of computing devices can also be prevented (e.g., to exfiltrate sensitive information and/or carry out an attack), thereby maintaining the proper functioning of those network entities. As a result, the unnecessary expenditure of compute resources (e.g., central processing units (CPUs), storage devices, memory, power, networks, etc.) associated with various entities on a network is mitigated.

In addition, generating a privacy risk score in accordance with the disclosed techniques allows for detection of complex buggy code patterns (e.g., logical errors based on predictors, such as rushed development, lack of domain knowledge, complexity and interdependencies, inadequate testing via machine learning models) that are difficult and/or impossible to detect by traditional analysis techniques, such as existing static analysis techniques. Accurate detection of such complex buggy code patterns further enables a reduction in privacy data leaks, which can advantageously provide various benefits as described above.

Still further, example embodiments disclosed herein allows for quicker detection of code changes (e.g., in real-time or near real-time) that potentially include bugs that increase the likelihood of a privacy incident occurring. Accordingly, disclosed embodiments allow for a reduction in a Time To Detection (TTD) and/or Time To Mitigation (TTM), as embodiments enable the detection and/or notification (e.g., to a developer who introduced a code change and/or who has a full understanding of the code of a code change) of a possible privacy data leak risk as soon as code containing potentially buggy lines are introduced (e.g., for implementation in a production version of program). In contrast, conventional techniques (e.g., static analysis tools) analyze programs as a whole (rather than at the time of a code change), and are thus unable to detect potentially buggy code at the time of introduction into a program.

Embodiments for evaluating a privacy incident risk are implemented in various way. For instance, FIG. 1 shows a block diagram of a privacy risk evaluation system 100, according to an example embodiment. As shown in FIG. 1, system 100 includes a computing device 102, a code repository 110, and a computing device 112, coupled to one or more networks 116. As shown in FIG. 1, computing device 102 includes a developer user interface (UI) 104, a code changeset 106, and a risk score 108. Computing device 112 includes code changeset 106, a privacy incidence evaluator 114, and risk score 108. An example device that may incorporate the functionality of computing device 102, code repository 110, and/or computing device 112 (or any subcomponents therein, whether or not illustrated in FIG. 1) is described below in reference to FIG. 9. It is noted that system 100 may comprise any number of devices, including those illustrated in FIG. 1 and optionally one or more further devices or components not expressly illustrated. System 100 is further described as follows.

In an example implementation, network 116 includes one or more of any of a local area network (LAN), a wide area network (WAN), a personal area network (PAN), a combination of communication networks, such as the Internet, and/or a virtual network. In example implementations, computing device 102, code repository 110, and/or computing device 112 communicate via network 116. In an implementation, any one or more of computing device 102, code repository 110, and/or computing device 116 communicate over network 116 via one or more application programming interfaces (API) and/or according to other interfaces and/or techniques. In an example, computing device 102, code repository 110, and/or computing device 112 each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 includes any number of one or more computing devices of one or more users (e.g., individual users, family users, enterprise users, governmental users, etc.) that each comprise one or more applications, operating systems, virtual machines, storage devices, etc. used to view, modify, test, and/or evaluate computer code (e.g., source code). Computing device 102 comprises any type of stationary or mobile computing device, including a mobile computer or mobile computing device (e.g., a Microsoft® Surface® device, a personal digital assistant (PDA), a laptop computer, a notebook computer, a tablet computer, a netbook, etc.), a desktop computer, a server, a mobile phone or handheld device (e.g., a cell phone, a smart phone, etc.), a wearable computing device (e.g., a head-mounted device including smart glasses, a smart watch, etc.), an Internet-of-Things (IoT) device, or other type of stationary or mobile device. Computing device 102 is not limited to a physical machine, but may include other types of machines or nodes, such as a virtual machine. In an examples, computing device 102 interfaces with other components illustrated in FIG. 1 through APIs and/or by other mechanisms.

In examples, developer UI 104 comprises a user interface for authoring, modifying, accessing, testing, and/or evaluating computer code. In examples, the computer code comprises any type of programming code that defines the operations and/or functionality of a software program. Developer UI 104 comprises any one or more UI elements, user input-fields, menus, etc. that enable a user (e.g., a programmer, developer, etc.) to access, modify, etc. computer code that define the operation and/or functionality of a program. In implementations, the computer code (e.g., source code or assembly code) is written in computer programming language, including but not limited to C, C++, C#, Python, Java, JavaScript.

In examples, the computer code, when compiled, causes an executable program to be generated. As used herein, a software program includes any set of program instructions that can be executed on one or more processing devices. As examples, software programs include, but are not limited to, operating systems, desktop software, mobile phone software, web-based applications or services, or cloud-based applications or services.

In some example embodiments, the computer code comprises an entire set of code for a software program. In other example embodiments, the computer code comprises only a portion of the computer code for a software program. In various embodiments, a user interacts with developer UI 104 and code presented therein to generate code changeset 106. Code changeset 106 comprises a portion of computer code that is intended to be implemented in a software program. For instance, code changeset 106 includes an addition of a portion of computer code for inclusion in a software program, removal of a portion of computer code from a software program, and/or a modification of a portion of a computer code in a software program. In examples, code changeset 106 includes a delta or difference between code currently present in the software program (e.g., as included in code repository 110), and the code that is to be implemented therein by virtue of the changeset. In various example embodiments, code changeset 106 comprises a pull request (PR) that is provided to code repository 110 and/or one or more other computing devices (e.g., user devices, such as user devices of reviewers identified in the pull request).

Risk score 108 comprises a measure indicative of a likelihood of a privacy incident occurrence as a result of code changeset 106 being implemented in a software program. In examples, risk score 108 is generated by privacy incidence evaluator 114, as described in greater detail below. While example embodiments are described herein that privacy incidence evaluator 114 generates risk score 108 based on code changeset 106, it should be understood that in various other embodiments, privacy incidence evaluator 114 is configured to generate risk score 108 based on any set of computer code provided thereto (e.g., any portion of a code for a software program or an entire set of code for a software program). In examples, risk score 108 is presented in developer UI 104 as a number, grade, or any other measure (e.g., indicative of a low likelihood to a high likelihood of a privacy incidence occurrence). In some implementations, risk score 108 also includes one or more comments and/or annotations generated by privacy incidence evaluator 114, such as portions of code changeset 106 and/or any other features described herein (e.g., keywords, historical behavior, etc.) that affected the manner in which the score was generated. In various other embodiments, risk score 108 is provided in connection with one or more remediation measures, such as measures that are implemented automatically or via a user input. While not expressly illustrated, risk score 108 (and any associated changeset, comments, annotations, remediation actions, etc.) is stored in a suitable database or other storage in some implementations. For instance, if no action was taken by a developer based on a privacy risk score, then the risk score is maintained in storage such that it can be accessed later (e.g., by a privacy breach team) to identify and/or address a root cause of a privacy leak from a stored chain of changes and scores.

Code repository 110 comprises a storage (e.g., a local storage, a cloud-based storage, etc.) for storing information (e.g., computer code) associated with one or more programs. In one example, code repository 110 is configured to computer code (or portions thereof) that are authored via developer UI 104 or via authored via other means (e.g., by a bot). In some examples, code repository 110 is configured to store code generated from the authored computer code, such as compiled code, configuration information, telemetry generated from an executing program, or other information associated with a program. Code repository 110 comprise any type of storage unit, including but not limited to a memory or storage device (e.g., physical storage devices, local storage devices, cloud-based storages, disks, hard disk drives, solid state devices (SSDs), random access memory (RAM) devices, etc.), computing devices containing such memory or storage devices, or a collection thereof.

Although not expressly illustrated, in various embodiments, code repository 110 is configured to store any other information associated with, or accessed by, a program, such as data that is private or sensitive (e.g., confidential, critical, secure, and/or not otherwise intended for public dissemination), including but not limited to company records, personal information, educational information, health information, professional information, organizational or company information, banking or other financial records, legal documents, biographic information such as birth certificates, driver's licenses, passports, etc. These examples are illustratively only, and code repository 110 includes any other type of data (including both confidential and non-confidential information) stored in any device whether locally and/or on a cloud-based storage in various implementations.

In examples, computing device 112 comprises a group or collection of servers (e.g., computing devices) that are each accessible by a network such as the Internet (e.g., in a "cloud-based" embodiment). In example embodiments, computing device 112 is a computing device that is located remotely (e.g., in a different facility) from computing device 102 and/or code repository 110. Computing device 112 comprises any number of computing devices, and includes any type and number of other resources, including resources that facilitate communications with and between servers, storage by the servers, etc. (e.g., network switches, storage devices, networks, etc.). In an embodiment, devices of computing device 112 are co-located (e.g., housed in one or more nearby buildings with associated components such as backup power supplies, redundant data communications, environmental controls, etc.) to form a datacenter, or are arranged in other manners. Accordingly, in an embodiment, computing device 112 is a datacenter in a distributed collection of datacenters.

In implementations, privacy incidence evaluator 114 is configured to retrieve code changeset 106 from computing device 114 and generate risk score 108 therefrom. In one example embodiment, privacy incidence evaluator 114 determines a plurality of scores that are combined (e.g., aggregated) to determine risk score 108. For instance, privacy incidence evaluator 114 determines a tokenization score based on one or more keywords present in code changeset 106, where the tokenization score is indicative of the presence of one or more privacy-related terms in code changeset 106. For example, where one or more privacy-related terms are present, the determined tokenization score is elevated, indicating that the changeset comprises code that has the possibility of resulting in a privacy leak. In another example, privacy incidence evaluator 114 generates a historical score relating to data stored in code repository 110 (e.g., a larger set of code related to the changeset, or code in the repository unrelated to the changeset). In various examples, the historical score takes into account various features associated the author of the code changeset, reviewers of the code changeset, characteristics of code stored in the repository, or various other aspects that can be extracted from data stored in code repository 110. In various examples, the tokenization score and/or historical score are generated based on heuristics and/or other techniques (e.g., using machine learning or other predictive models). Additional details regarding the operation and functionality of privacy incidence evaluator 114 (in addition to other components described herein) are provided in further detail below.

In an example, upon generation of risk score 108, privacy incidence evaluator 114 causes the risk score to be provided to computing device 108 from which code changeset 106 was provided. In response to the generation and/or providing of risk score 108, one or more remediation actions are taken in examples, such as receiving a modification to the code changeset to reduce the likelihood of a privacy incident. In other examples, risk score 108 is stored in a repository along with an identification of the code changeset, such that the risk score can be accessed at a later time (e.g., in the event a privacy incident does arise, to determine a root cause of the privacy incident). Various other actions taken in response to generation of risk score 108 are also contemplated, as will be appreciated by those skilled in the relevant arts.

Implementations are not limited to the illustrative arrangement shown in FIG. 1. For instance, computing device 102, code repository 110, and/or computing device 112 not be separate or located remote from each other. In some examples, any one or more of computing device 102, code repository 110, and/or computing device 112 (or any subcomponents therein) are located in or accessible via the same computing device or distributed across a plurality of devices. For instance, techniques described herein are implemented in a single computing device. Furthermore, system 100 comprises any number of other storage devices, networks, servers, and/or computing devices coupled in any manner in various embodiments.

Figure 2:
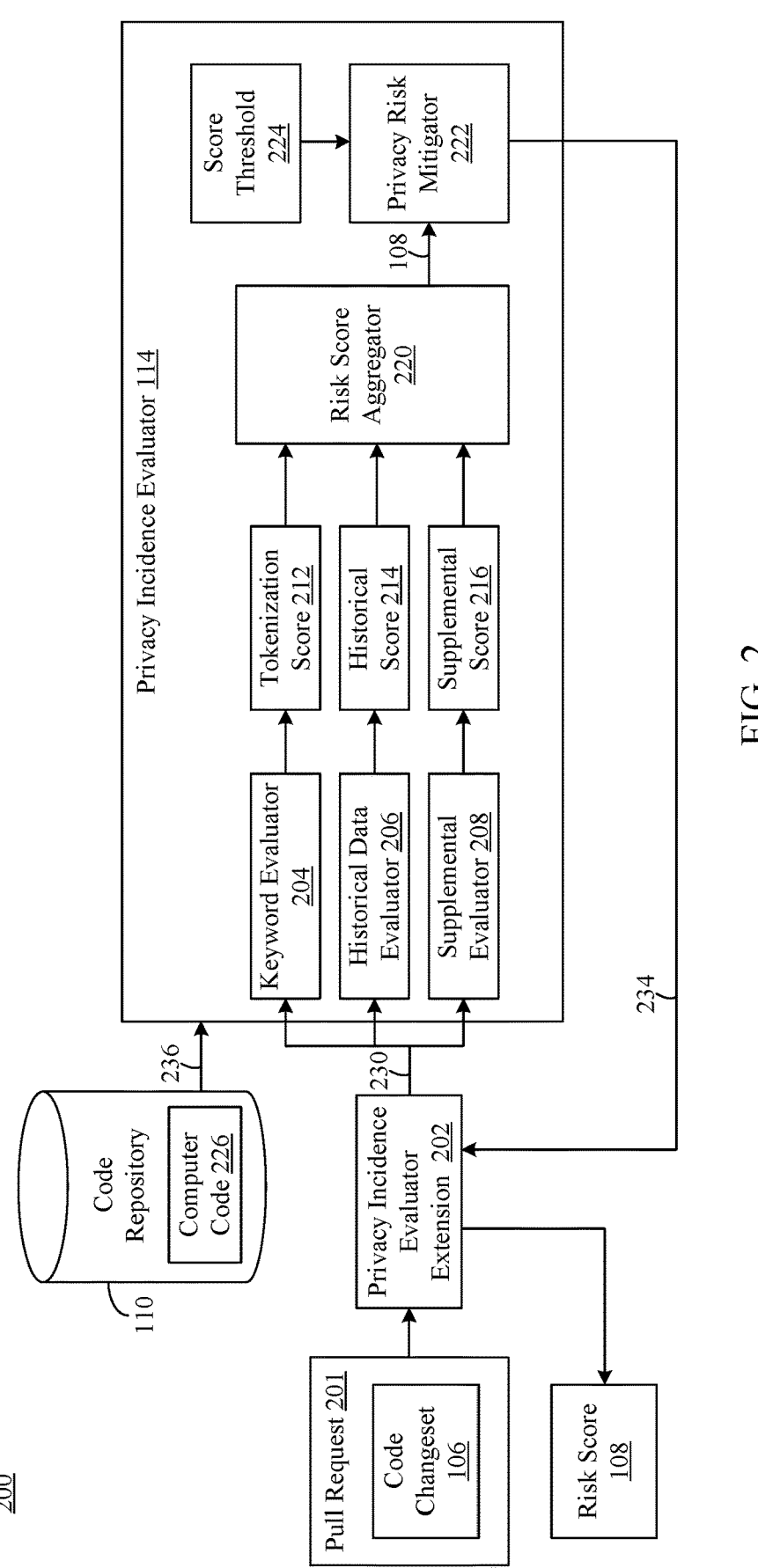
FIG. 2 shows a block diagram of another privacy risk evaluation system, in accordance with an embodiment.

FIG. 2 depicts a block diagram of another privacy risk evaluation system 200, according to an example embodiment. As shown in FIG. 2, system 200 includes a pull request 201, a privacy incidence evaluator extension 202, and example implementations of risk score 108, code repository 110, and privacy incidence evaluator 114. Pull request 201 includes an example implementation of code changeset 106. Code repository 110 includes a set of computer code 226. As shown in FIG. 2, privacy incidence evaluator 114 includes a keyword evaluator 204, a historical data evaluator 206, supplemental evaluator 208, a tokenization score 212, a historical score 214, a supplemental score 216, a risk score aggregator 220, a privacy risk mitigator 222, and a score threshold 224.

In examples, pull request 201 is generated via developer UI 104 and comprises a request to merge (e.g., implement) code changeset 106 with computer code 226. In examples, pull request 201 identifies code changeset 106 (e.g., as a delta of code that is to be added, removed, modified, etc.), an author of code changeset 106 (which can be an individual or a bot), and/or one or more reviewers of code changeset 106. For example, the author of code changeset 106 interacts with developer UI 104, upon finishing code changeset 106, to identify one or more reviewers (e.g., peers, other developers, etc.) to review the code changeset for various reasons (e.g., to determine whether the code changeset satisfies a set of requirements). In some implementations, pull request 201 comprising the code changeset is implemented within computer code 226 after approval by one or more identified reviewers. In other examples, pull request 201 is implemented in code changeset 201 upon generation thereof.

Computer code 226 stored in code repository 110 comprises a set of code associated with code changeset 106. In examples, computer code 226 comprises a set of computer code (e.g., an entire set of code) for an application under development and/or currently being executed. In various embodiments, code changeset 106 comprises only a portion (e.g., a particular section or chunk) of code for implementation in a larger set of computer code 226. While a singular set of computer code 226 is depicted in FIG. 2, code repository 110 contains any number of different sets of computer codes (e.g., code for different applications, functions, etc.) in examples.

In examples, pull request 201 includes any type of request relating to a portion of code. In one example, pull request 201 comprises a bug introducing pull request, which is a pull request that includes a first introduction of a set of flawed lines of code (e.g., lines of code that were missed and/or flawed) that are identified to be a root cause of a prior problem. In another example, pull request 201 comprises a bug manifesting pull request that indicates that a problem was revealed. In another example, pull request 201 comprises a bug fixing pull request that includes one or more fixes to a problem. In another example, pull request 201 comprises a bug mitigating pull request that includes a temporary fix to mitigate a problem (e.g., while a permanent fix to a problem is being developed). Various other types of pull requests are contemplated and within the scope of the disclosed embodiments.

Privacy incidence evaluator extension 202 comprises an interface between pull request 201 and privacy incidence evaluator 114. In examples, privacy incidence evaluator extension 202 is configured to retrieve (e.g., intercept) pull request 201 and/or any other information related to the changeset contained therein (e.g., from the developer UI and/or any related developer platform), provide the pull request 201 and provide the pull request to privacy incidence evaluator 114. In some examples, privacy incidence evaluator extension 202 assigns a unique identifier to the pull request and provides the unique identifier along with the pull request to privacy incidence evaluator 114. In various examples, privacy incidence evaluator extension 202 adds the identifier and/or pull request to an evaluation queue (not shown) in privacy incidence evaluator 114.

In examples, privacy incidence evaluator extension 202 is configured to obtain an action 234 associated with risk score 108 for the obtained pull request from privacy incidence evaluator 114 based on the identifier. In some examples, privacy incidence evaluator extension processes the action by providing a notification and/or recommended action to developer UI 104 or other component (e.g., a computing device associated with an author and/or one or more reviewers of the code changeset), and/or automatically causing the recommended action to be performed. In various examples, privacy incidence evaluator extension 202 retrieves the risk score from a results queue (not shown) in privacy incidence evaluator 114.

In examples, privacy incidence evaluator 114 is configured to generate risk score 108 based on one or more evaluators. For instance, keyword evaluator 204 is configured to analyze keywords contained in code changeset 106 to identify one or more privacy terms contained therein. A privacy term comprises a token (which can include a word, phrase, string, abbreviation, or other set of alphanumeric characters) indicating that a portion of computer code relates to potentially sensitive material and/or functionality. In one example, a privacy term is a token that relates to code functionality that has a potential to (e.g., is likely to) affect the manner in which private information is retrieved, accessed, stored, or maintained, such that implementation of the code changeset including the privacy term would raise the risk of a privacy incident occurring in the future. Examples of privacy terms include terms such as tenant or tenant ID, user or user ID, cache, access, authorization, token, job partitioning, email address, login, password, cookies, personal identifiable information (PII) words (such as first name, last name, date of birth, social security number, etc.), or any other term that indicates that computer code potentially relates to a privacy issue.

Upon analyzing keywords contained in code changeset 106, keyword evaluator 204 generates a tokenization score 212 indicative of a presence (or a lack thereof) of one or more privacy terms in code changeset 106. For instance, tokenization score 212 comprises a value that represents a likelihood that one or more tokens of code changeset 106 relates to a privacy issue, such that code changeset 106 could result in a privacy incident (e.g., a leak of private information). In examples, keyword evaluator 204 evaluates tokens contained in code changeset 106 in various ways to generate tokenization score 212, as will be described in greater detail below.

In examples, historical data evaluator 206 is configured to analyze data stored in one or more repositories, such as computer code 226 and/or other data (e.g., code unrelated to the code changeset) stored in code repository 110 to generate historical score 214. The analyzed data from the repository includes, but is not limited to, behaviors of the author of code changeset 106, behaviors of one or more peers identified in pull request 201, characteristics of computer code stored in the repository (e.g., the age of a set of code), or various other features described herein. As examples, historical data evaluator 206 determines whether the author of code changeset 106 or reviewers identified in the pull request related to code changeset 106 have modified code in the repository before (code related to and/or unrelated to the changeset), whether computer code 226 has been modified before, how often computer code 226 has been modified, the extent of any of the aforementioned, a familiarity level of the author and/or reviewers with computer code 226 and/or code changeset 106, a likelihood such individuals would introduce a software flaw into code based on past behaviors, etc. These examples are not meant to be limiting, and other examples will be described elsewhere herein. Based on such data that is mined from the repository, historical data evaluator 206 generates historical score 214 that is indicative of historical behaviors that have a likelihood of contributing to an occurrence of a privacy incident. As noted, historical data evaluator 206 generates historical score 214 in various ways, as will be described in greater detail below.

Supplemental evaluator 208 comprises one or more implementations of additional code analysis techniques, such as one or more static analysis detection techniques, dynamic analysis detection techniques, machine learning (ML) based code analysis techniques, code metrics, test coverage (e.g., whether code changeset 106 was accompanied by a test report or other testing information), a code complexity (e.g., cyclomatic complexity), or other algorithms or techniques in which code is analyzed to identify the presence of software flaws, bugs, or anomalies that contribute to a likelihood of a privacy incident occurring. Based on such additional code analysis techniques, supplemental evaluator 208 is configured to generate supplemental scores 216. In some implementations where multiple additional code analysis techniques are implemented as part of supplemental evaluator 208 and a plurality of such techniques identify a relatively high likelihood of a software flaw or bug, supplemental evaluator 208 elevates supplemental score 216. Supplemental evaluator 208 is not limited to the aforementioned examples, and can include one or more additional techniques as will be appreciated to those skilled in the relevant arts.

In implementations, risk score aggregator 220 is configured to obtain tokenization score 212, historical score 214, and/or supplemental score 216 and aggregate such scores to generate an aggregated privacy risk score. In examples, the aggregated privacy risk score (i.e., risk score 108) represents a likelihood that code changeset 106, if implemented in computer code 226 (or otherwise executed in any manner), would result in a leak of private (e.g., sensitive) information. In various embodiments, risk score aggregator 220 aggregates each of the obtained scores in a weighted fashion. For instance, risk score aggregator 220 assigns a first weight to tokenization score 212, a second weight to historical score 214, and a third weight to supplemental score 216. In some examples, risk score aggregator 220 performs a weighted average based on the obtained scores. In this manner, any of the obtained scores may be weighted heavier than (or the same as) any other score.

In an example, each of the obtained scores are bound by an upper limit and a lower limit (e.g., 0 to 100). In embodiments, the upper and lower limit for each of the obtained scores is different from or the same as each other. Upon aggregating the obtained scores, risk score aggregator 220 generates the risk score similarly bound by an upper and lower limit (which may be the same or different limits as the obtained scores) in various examples.

In examples, privacy risk mitigator 222 is configured to obtain the aggregated risk score 108 and determine whether the risk score has a predetermined relationship (e.g., is above or below) score threshold 224. Score threshold 224 comprises a value above or below which the privacy risk score should be provided to one or more entities associated with code changeset 106, such as the author of the code changeset or any reviewers associated therewith. For instance, if privacy risk mitigator 222 compares the risk score with score threshold 224 and determines that the risk score has a predetermined relationship with the threshold, privacy risk mitigator 222 performs an action to mitigate a risk of a privacy incident occurring in the future as a result of the code changeset. In examples, privacy risk mitigator perform various types of mitigation actions, including but not limited, recommending a remediation action (e.g., for presentation in developer UI 104), automatically performing the recommended remediation action, and/or generate a notification associated with the code changeset. In an example, the notification includes the risk score for providing to privacy incidence evaluator extension 202 (e.g., in a results queue or the like). It should be noted, however, that in various embodiments, score threshold 224 need not be implemented. In such a scenario, upon generation of risk score 108, privacy risk mitigator 222 is configured to automatically perform a mitigation action as described herein (e.g., recommending a remediation action such as a code change, performing the recommended remediation action, generating a notification, etc.)

In some embodiments, a notification generated by privacy risk mitigator 222 contains additional information beyond risk score 108, such as keywords of code changeset 106 that contributed to the generated risk score, historical data that contributed to the generated risk score, or any other factors described herein that contributed to the generated risk score. In some implementations, the notification comprises an indication that code changeset 106 contains a likelihood of a leak of private data without identifying factors that contributed to the generated score. In various implementations, the risk score is stored in a suitable storage (e.g., a database) along with an identification of the code changeset, such that the score and/or changeset is accessed at a later time (such as to determine a root cause for a privacy leak).

In accordance with one or more embodiments, a likelihood of a privacy incident occurring is determined in various ways such that privacy leaks can be mitigated and/or prevented. For example, FIG. 3 shows a flowchart 300 of a method for evaluating a privacy incident risk, in accordance with an example embodiment. In an embodiment, flowchart 300 is implemented by system 100 as shown in FIG. 1 and/or system 200 as shown in FIG. 2. Accordingly, flowchart 300 will be described with reference to FIGS. 1 and 2. Other structural and operational embodiments will be apparent to persons skilled in the relevant art(s) based on the following discussion regarding flowchart 300, system 100 of FIG. 1 and system 200 of FIG. 2.

Flowchart 300 begins with step 302. In step 302, a code changeset is retrieved that identifies a change from a prior version of a code. For instance, with reference to FIG. 2, privacy incidence evaluator extension 202 is configured to retrieve pull request 201 that comprises code changeset 106. In examples, code changeset 106 identifies a change from a prior version of computer code 226. For instance, code changeset 106 comprises a portion of computer code 226 (e.g., a software program that is under development or has been released) that contains one or more modifications, such as code that was added, deleted, or otherwise changed from a prior version that is stored in code repository 110. In various examples, the code changeset identifies a portion of code that an author intends to implement within a larger set of code (e.g., computer code 226) stored in code repository 110.

It should be noted, however, that while examples are described herein in which a code changeset (e.g., a delta between a prior version of a code) is retrieved, other types of code are also able to be retrieved in accordance with the disclosed techniques. In one example, the retrieved set of code comprises a new set of code for which a prior version does not exist. In some other examples, the retrieved set of code comprises a portion of code that is saved locally to a computing device. In yet another example, the retrieved set of code comprises code in addition to a changeset (e.g., an entire set of code for a software application).

In step 304, a tokenization score indicative of a presence of a privacy term in the code changeset is determined. For instance, with reference to FIG. 2, keyword evaluator 204 is configured to obtain information 230 associated with code changeset 106 and determine a score indicative of whether any terms of code changeset 106 comprises a privacy term. In embodiments, determining a score indicative of a presence of a privacy term comprises generating a value (e.g., a numerical value) between a range of values representing a usage of one or more privacy terms in code changeset 106. For instance, where one or more privacy terms are present in code changeset 106, the tokenization score is elevated. Conversely, where no privacy terms are present, the tokenization score is reduced (e.g., to a minimum possible score in a range of scores).

As examples, privacy terms include, but are not limited to, keywords (e.g., phrases, characters, strings, etc.) that indicate that a portion of code is related to, or otherwise potentially affects, the manner in which private information is retrieved, accessed, stored, or maintained. Accordingly, in examples, keyword evaluator 204 analyzes the content within code changeset 106 (e.g., the language of the code and/or code comments contained therein) to identify the presence of privacy-related terms therein. In various embodiments, keyword evaluator 204 is configured to classify keywords contained in code changeset, where the classification indicates whether the term is a privacy term, a type of privacy term (e.g., whether the term relates to access control, caching, passwords, PII, etc.). In this manner, keyword evaluator 204 classifies various terms contained in the code changeset based on different privacy term types.

In some examples, human behavior-related keywords are also identified in code changeset 106. For instance, changed text within a pull request or other transmission of code changeset 106 is extracted that indicates behavioral aspects contributing to the possible introduction of software bugs. Such information is extracted from information 230 associated with code changeset 106, including but not limited to descriptive text and/or developer comments (e.g., TODO or FIXME comments, commit messages, or other comments that suggest that code needs to be fixed or corrected), text in configuration files, testing files committed with the code, etc.

As will be described in greater detail below, keyword evaluator 204 analyzes keywords contained in code changeset 106 in various ways. In one implementation, keyword evaluator 204 utilizes a natural language processing (NLP) model to identify privacy terms therein. In another example, keyword evaluator 204 identifies a semantic meaning of keywords contained in the code changeset to determine if any of the keywords (or semantically similar) keywords comprise privacy terms. In another example, keyword evaluator utilize one or more ML models to identify the presence of privacy terms in code changeset 106.

Based on identifying a privacy term in code changeset 106, keyword evaluator 204 generates tokenization score 212. In examples, tokenization score 212 comprises a value that is indicative of a presence of a privacy term in the code changeset. In some examples, such as where multiple privacy terms are present in a code changeset, tokenization score 212 is generated such that the generated score reflects a higher occurrence of privacy terms (e.g., by generating a higher tokenization score). Further examples and techniques will be described in greater detail below with respect to the generation of tokenization score 212.

Such approaches allow for a language-agnostic analysis, and is not limited to programming language itself (e.g., techniques may be utilized to analyze information associated with code changes, such as developer comments, information in configuration files, etc.), thereby improving the overall accuracy in identifying a risk of a privacy leak.

In step 306, a historical score based on a set of computer code stored in a repository is determined. For instance, with reference to FIG. 2, historical data evaluator 206 is configured to generate historical score 214 based on computer code 226 stored in code repository 110. In examples, computer code 226 incudes code related to code changeset 106 (e.g., a set of code with which the code changeset is to be merged) and/or code unrelated to code changeset 106. In various implementations, historical score 214 is generated based on an evaluation of one or more predictors. For instance, a predictor comprises information mined from a data repository that measures a likelihood that code changeset 106 would result in a leak of private information based on observed behaviors (e.g., past behaviors correlated with privacy incidents and/or a high likelihood of a privacy incident occurrence).

In examples, the predictors are generated from an evaluation (e.g., an empirical and/or statistical analysis) of past privacy incidents that occurred as a result of a coding error (e.g., a bug that was introduced into a program via a code changeset). For instance, a predictor evaluates code changeset 106, computer code 226, previous code changesets stored in the repository, and/or any entity (e.g., author or reviewer) associated with the foregoing in light of past privacy incidents (or other previously observed high-risk privacy behaviors). In addition, the predictors are improved over time based on an analysis of new or future privacy incidents (e.g., incidents occurring after the predictors are initially generated and/or selected), such as by ingesting information associated with privacy incidents that capture new or different trends or behaviors with respect to coding errors. In various embodiments, the predictors are generated by extracting characteristics associated with code, code changes, authors, bugs, code metrics (in addition to other characteristics, as described in further detail below) from a code repository 110 and/or any other repository. Additional, non-limiting examples predictors are described in Section III below. Based on the historical data (e.g., one or more predictors), historical data 206 generates historical score 214.

In examples, historical score 214 is generated based on one or more factors other than the code contained in code changeset 106 that indicates a likelihood of a privacy incident occurring. In other words, in various embodiments, historical score 214 comprises a measure indicating a degree to which behaviors (e.g., previously observed behaviors correlated with past privacy incidents) separate from code changeset 106 are suggestive of a privacy risk occurrence (e.g., whether past behaviors indicate a higher or lower likelihood that code changeset 106 would result in a leak of private information). In one illustrative example, historical data evaluator 206 generates historical score 214 based on whether the author or identified reviewers of code changeset 106 has modified any code associated with the changeset (e.g., computer code 226, or any other code which code changeset 106 is intended to be a part of). In another example, historical score 214 is generated based on prior bugs the author or reviewers have introduced in computer code 226 or other code stored in code repository 110. In another example, historical score 214 is generated based on whether computer code 226 has previously been associated with a privacy incident, or otherwise contained security flaws or other software bugs. These examples are only illustrative, and it should be understood that historical score 214 is able to be generated based on any predictor that contributes to a likelihood that a privacy incident could occur, as described in further detail below (e.g., in Section III).

Such techniques allow for capturing data that is not necessarily related to software artifacts and not detectable by traditional tools, such as circumstances that are known to correlate with bug introduction and human behavior (e.g., changes to files that have had many bugs in the past, introduction of a large changeset at once, etc.). As a result, further improvements of predicting a risk of a privacy leak can be achieved in accordance with the disclosed techniques.

In step 308, a privacy risk score is generated from the tokenization score and the historical score. For instance, with reference to FIG. 2, risk score aggregator 220 is configured to obtain tokenization score 212 and historical score 214, and aggregate the obtained scores to generate risk score 108. In various embodiment, risk score aggregator 220 is also configured to obtain one or more other scores, such as supplemental score 216 generated via other detection techniques, and aggregate these scores with tokenization score 212 and historical score 214.

Risk score aggregator 220 performs score aggregation in various ways, such as by generating a weighted average of the obtained scores. In other examples, the aggregated score comprises a summation of the obtained scores. In yet other examples, the aggregated score comprises any other mathematical combination of the obtained scores.

In step 310, an action is performed based on the privacy risk score to mitigate a risk of a privacy incident occurrence. For instance, with reference to FIG. 2, privacy risk mitigator 222 is configured to perform any one or more actions 234 based on risk score 108 to mitigate a risk of a privacy incident occurrence (e.g., to reduce the likelihood that a leak of private data would result if code changeset 106 was merged with computer code 226 or otherwise executed). In examples, the action is provided to privacy incidence evaluator extension 202 for execution, or may be provided directly to another component (e.g., to computing device 102, developer UI 104, or any other component or computing device).

In implementations, various types of actions are performed. In one example, privacy risk mitigator 222 generates one or more recommended remediation actions that is provided to developer UI 104. In some implementations, the recommended remediation actions include a recommendation to review code changeset 106 to reduce the risk of a privacy incident occurrence, one or more recommended steps (e.g., code changes or other changes) to mitigate the risk, recommending review of the code changeset by one or more other users, a recommendation to disable merging of code changeset 106 with computer code 226 or otherwise disabling execution of code changeset 106 until the risk is reduced or the risk is acknowledged, or other types of actions to remediate the risk of a privacy incident occurrence. In another example, the recommended remediation action includes a recommendation to initiate a comprehensive test of the code change and/or the computer code in which the code change was merged (e.g., cross-tenant testing, cross-user testing, etc.) to identify a privacy-related change or changes. In other implementations, the action comprising an automatic performance of any one or more of such actions (or other remediation actions) to mitigate the risk of a privacy incident occurrence, by privacy risk mitigator 222, privacy incidence evaluator extension 202, computing device 102, developer UI 104, or any other component described herein.

In yet some other implementations, the action comprises generating a notification associated with code changeset 106. For instance, with reference to FIG. 2, privacy risk mitigator 222 is configured to obtain risk score 108 and perform one or more remediation actions based on the obtained risk score. For example, privacy risk mitigator 222 performs the action if the generated risk score has a predetermined relationship with score threshold 224 (e.g., the risk score is above a threshold value). In this manner, risk scores that indicate a privacy leak is unlikely are not acted upon (e.g., not identified to authors of a code changeset), while risk scores that indicate a relatively high risk of a privacy leak would result in generating a remediation action such that the potential privacy leak risk can be identified, reviewed, and/or mitigated. In one example, the notification comprises a message for presentation in developer UI 104 that identifies code changeset 106, an associated risk score, and/or comments associated with the risk score. In examples, privacy incidence evaluator extension 202 provides the notification comprising the risk score in various types of messages, such as email, text, chat, etc., or via any type of indication or alert that is presented in a computing device (or an application executing therein).

In another example, the notification comprises information (e.g., the risk score and an identification of an associated code changeset) provided to a database or other storage for logging, tracking, and/or review (e.g., in a dashboard, such that high risk pull requests or other attempted code changes can be tracked). In various other examples, the notification comprises providing risk score 108 and an identification of the associated code changeset for storage a suitable device or location, such that the risk score can be identified at a later time (e.g., in connection with a root cause analysis for a privacy leak). In some other implementations, the notification comprises providing risk score 108 and an identification of the associated code changeset to a model training algorithm, such that the performance and/or confidence level of privacy incidence evaluator 114 (e.g., machine learning or other models therein) can be improved.

In yet some other examples, the notification is provided to a user and/or system for deriving one or more policies, rules, insights, etc., based on a continuous analysis of changesets (and/or associated behavioral analysis) as disclosed herein to improve the accuracy and/or performance of privacy incidence evaluator 114, including any of the subcomponents described herein. For instance, where large or scattered changesets include sensitive characteristics that are identified as being likely to result in a privacy or security incident (e.g., the changeset includes many privacy terms), privacy incidence evaluator 114 is configured to implement one or more changes to change the functionality thereof, such as breaking down similarly sized or scattered changesets into smaller portions, to improve the accuracy of the system.

Accordingly, disclosed techniques relate to monitoring software changes (e.g., within pull requests or the like) to evaluate whether a software change may lead to a data leak based on various types of predictors. In the disclosed manner, privacy incidence evaluator 114 therefore provides a lightweight and scalable approach that accurately identifies code changeset that are risky from a privacy leak standpoint at development time (e.g., when code is developed, before the code is released for execution in a production environment), while doing so in a manner that conserves resources (e.g., by analyzing a code changeset, among other features, rather than an entire set of code). Furthermore, disclosed techniques allow for determining a privacy leak risk based on a combination of different factors (e.g., based on different types of token analysis and/or historical data mining), allowing for further improvements in the accuracy of the system.

In accordance with various embodiments, a tokenization score is generated based on content contained within a code changeset. For example, FIG. 4 shows a flowchart 400 of a method for determining a tokenization score, in accordance with an example embodiment. In an embodiment, flowchart 400 is implemented by system 100 as shown in FIG. 1, system 200 as shown in FIG. 2, and/or a system 500 as shown in FIG. 5. Accordingly, flowchart 400 will be described with reference to FIGS. 1, 2, and 5. FIG. 5 shows a block diagram of a system 500 for determining a tokenization score, in accordance with an embodiment. As shown in FIG. 5, system 500 includes an example implementation of keyword evaluator 204, an example implementation of tokenization score 212, a privacy keyword listing 504, a language model 506, and a similarity threshold 508. Keyword evaluator 204 comprises a classifier 502, as depicted in FIG. 5. Other structural and operational embodiments will be apparent to persons skilled in the relevant art(s) based on the following discussion regarding flowchart 400, system 100 of FIG. 1, system 200 of FIG. 2, and system 500 of FIG. 5.

Flowchart 400 begins with step 402. In step 402, a semantic similarity is determined between a token in the code changeset with a listing of privacy keywords. For instance, with reference to FIG. 5, keyword evaluator 204 is configured to obtain information 230 corresponding to code changeset 106 (which includes the content of the code changeset, among other things, such as an identification of an author, reviewers, etc.). Based on the content of code changeset 106, keyword evaluator 204 is configured to determine a semantic similarity between any one or more tokens of the code changeset and keywords contained in privacy keyword listing 504. In examples, the semantic similarity represents a degree of similarity between a meaning of a first token and a meaning of a second token. In examples, privacy keyword listing 504 contains a listing of privacy terms (e.g., tokens that indicate a possibility that functionality relating to private data is being altered). In some embodiments, one or more privacy terms contained in privacy keyword listing 504 are extracted from analyzing code (e.g., bug introducing pull requests or other pull requests or code changes as described herein) that was involved in a prior privacy incident. Privacy keyword listing 504 comprises any form, such as a table, database, dictionary, etc. of predetermined terms, that if present in a portion of computer code, could potentially affect the risk of a privacy incident occurrence.

In various examples, keyword evaluator 204 applies language model 506 to privacy keyword listing 504 and code changeset 106 to identify a semantic similarity of tokens contained in each. In one implementation, language model 506 comprises one or more language models that is used to generate a vector or other representation for a word or phrase. In some examples, language model 506 comprises an embedding model configured to generate an embedding. In examples, an embedding model comprise a deep-learning model that is configured to map a word or sequence of words to a numerical value, such as a multi-dimensional vector. In various implementations, the embedding model is trained based on an algorithm that utilizes language data that comprises the usage of words in a given language, such as books, academic literature, dictionaries, encyclopedias, data available on the Internet, newspapers, other language models, and/or any other language data. In some implementations, the embedding model is trained based on millions or billions of word or word combinations and comprise hundreds or even thousands of dimensions.

Furthermore, in various examples, language model 506 is trained using various types of learning techniques as will be appreciated to those skilled in the relevant arts, including but not limited to skip-gram, co-occurrence learning, negative sampling, etc. These examples are illustrative only and include other algorithms for training language model 506, including any other natural language processing (NLP) or natural language understanding (NLU) methods appreciated to those skilled in the relevant arts.

Language model 506 is generated in various forms. For instance, language model 506 is generated by applying a suitable supervised and/or unsupervised machine-learning algorithm. For example, language model 506 is generated by implementing a vector space learning algorithm to generate the embedding model as a vector space model. As a vector space model, language model 506 represents individual words or sequences of words in a continuous vector space (e.g., a multi-dimensional space), where similar words or sequences of words are mapped to nearby points or are embedded near each other. Furthermore, an artificial neural network learning algorithm is used in some implementations to generate and/or train language model 506 as a neural network that is an interconnected group of artificial neurons. The neural network is presented with word or sequence of words to identify a representation of the inputted word or sequences of words. Language model 506 could be implemented using any suitable neural network architecture. In examples, by applying language model 506, keyword evaluator 204 determines a semantic similarity value based on a level of similarity of tokens in code changeset 106 and tokens of privacy keyword listing 504 (e.g., based on their respective vector representations).

In step 404, a determination is made that the token in the code changeset is a privacy term in response to determining that the semantic similarity has a predetermined relationship with a similarity threshold. For instance, with reference to FIG. 5, keyword evaluator determines that a token in code changeset 106 is a privacy term (e.g., is the same or is semantically similar as a token in privacy keyword listing 504), in response to determining that the semantic similarity has a predetermined relationship with similarity threshold 508. Similarity threshold 508 comprises a value that is compared against a semantic similarity value discussed previously. Where the semantic similarity value has a predetermined relationship with the threshold (e.g., above or below the threshold), a determination is made that the two tokens are the same or at least semantically similar to each other. In this manner, keyword evaluator determines that two tokens have the same meaning, despite the tokens not being identical (e.g., due to typographical errors, different verb usages, different spellings, etc.).

Based on such a determination, keyword evaluator 204 determines that a token is a privacy term that potentially affects the manner in which a program handles private information. Such a process can be repeated for a plurality of tokens contained in the code changeset to determine whether each such token constitutes a privacy term. In examples, keyword evaluator 204 generates tokenization score 212 based on a determination that one or more tokens is a privacy term, such as by generating a score (e.g., a higher score) indicative of a higher likelihood that the code changeset contains language that can result in a privacy incident occurrence.

As noted above, keyword evaluator 204 comprises classifier 502. Classifier 502 is configured to classify (e.g., tag) one or more tokens of code changeset 106 into any number of privacy token categories, such as privacy-related keywords relating to individuals and/or entities (e.g., tenant or tenant ID, organization, user or user ID, profile, etc.), private data keywords (e.g., email, chat, etc.), privacy-related code structures and/or access control list (ACL) keywords (e.g., permission, security policy, authentication, authorization, caching, indexing, conditional statements, complex Boolean logic, tokens, singleton, access of a database such as an SQL database, etc.), and/or human behavior related keywords (e.g., descriptive text within the code changeset, such as commit messages and/or comments by the developer). Each of such tokens can be identified and/or utilized by keyword evaluator 204 in generating tokenization score 212. In implementations, classifier 502 operates in various ways, such as by rules or pattern matching, or using one or more machine-learning (ML) models (e.g., predictive models, classification models, etc.). In some embodiments, classifier 502 is trained using information observed from previous privacy incidents, such as tokens contained in pull requests (e.g., bug introducing pull requests) that resulted in past privacy incidents. Examples of such models include, but are not limited to, Word2Vec, designed by Google LLC, BERT (Bidirectional Encoder Representations from Transformers), TF-IDF (Term Frequency Inverse Document Frequency), and other suitable models.

A tokenization score is generated in various ways, as described herein. For example, FIG. 6 shows a flowchart 600 of a method for determining a tokenization score based on a frequency of a word, in accordance with an example embodiment. In an embodiment, flowchart 600 is implemented by system 100 as shown in FIG. 1, system 200 as shown in FIG. 2, and/or system 500 as shown in FIG. 5. Accordingly, flowchart 600 will be described with reference to FIGS. 1, 2, and 6. Other structural and operational embodiments will be apparent to persons skilled in the relevant art(s) based on the following discussion regarding flowchart 600, system 100 of FIG. 1, system 200 of FIG. 2, and system 500 of FIG. 5.

Flowchart 600 begins with step 602. In step 602, identify a frequency of a token in the code changeset. For instance, with reference to FIG. 5, keyword evaluator 204 is configured to identify a frequency of a token determined to be a privacy term in code changeset 106. In examples, the frequency comprises the number of occurrences of the token in code changeset 106.

In embodiments, the frequency is determined in various ways. In one implementation, keyword evaluator 204 determines the frequency of the token based on identifying occurrences of the same token in code changeset 106. In another implementation, keyword evaluator 204 determines the frequency of the token based on identifying semantically similar tokens as the token determined to be a privacy term.

In yet another implementation, keyword evaluator 204 relies on classifier 502 to determine a frequency of a given token. For instance, if a first token of code changeset 106 is matched to a first privacy term and a second token of code changeset 106 is matched to a second (different) privacy term, but both privacy terms are associated with the same classification (e.g., both terms relate to an "access control" classification), keyword evaluator 204 determines the frequency based on the common classification of the tokens.

In yet another implementation, keyword evaluator 204 determines a frequency of all tokens determined to be privacy terms, even if such tokens are not the same, semantically similar, or have different classifications. In other words, keyword evaluator 204 identifies an aggregated number of tokens that are classified as privacy terms in code changeset 106 in some implementations.

In step 604, the tokenization score is determined based on the frequency. For instance, with reference to FIG. 5, keyword evaluator 204 determines tokenization score 212 based on the frequency of the token determined to be a privacy term. As an illustration, keyword evaluator generates tokenization score 212 in a manner that reflects a higher likelihood of a privacy incident occurring (e.g., a higher score) based on the content of code changeset 106 where a higher frequency of privacy terms are contained therein. Conversely, where a lower frequency of privacy terms is present (or no such terms are present) in code changeset 106, keyword evaluator 204 generates a tokenization score that reflects a lower likelihood of a privacy incident occurring (e.g., a lower score). In some implementations, keyword evaluator 204 generates tokenization score 212 based on comparing the frequency with a frequency threshold (e.g., values above or below a threshold may cause the tokenization score to be elevated or lowered). Thus, while some embodiments generate tokenization score 212 based on the existence of a privacy term in code changeset 106 (e.g., regardless of how many times that privacy term or other privacy terms appear), other embodiments generate tokenization score based on a frequency (e.g., a threshold of how many privacy terms are present and how frequent they are in code changeset 106).

In accordance with various embodiments, a historical score can be generated in various ways. For example, FIG. 7 shows a flowchart 700 of a method for determining a historical score based on an extracted feature. In an embodiment, flowchart 700 is implemented by system 100 as shown in FIG. 1, system 200 as shown in FIG. 2, and/or a system 800 as shown in FIG. 8. Accordingly, flowchart 700 will be described with reference to FIGS. 1, 2, and 8. FIG. 8 shows a block diagram of a system 800 for determining a historical score, in accordance with an embodiment. As shown in FIG. 8, system 800 includes an example implementation of code repository 110, an example implementation of historical data evaluator 206, an example implementation of historical score 214, and a predictive model 806. In the illustration of FIG. 8, code repository 110 includes an example implementation of computer code 226, a modification history 802, a previous incident history 804, and additional features 808. Other structural and operational embodiments will be apparent to persons skilled in the relevant art(s) based on the following discussion regarding flowchart 700, system 100 of FIG. 1, system 200 of FIG. 2, and system 800 of FIG. 8.

Flowchart 700 begins with step 702. In step 702, a feature is extracted, where the feature is based on one or more of a code changeset, an entity associated with the code changeset, a previous code changeset stored in a repository, an entity associated with the previous code changeset, a set of computer code stored in a repository, or an entity associated with the set of computer code. For instance, with reference to FIGS. 2 and 8, historical data evaluator 206 is configured to obtain information 236 from code repository 110 (or any other repository not expressly illustrated) and/or information 230 associated with code changeset 106, and extract one or more features associated with such information. The extracted features relate to any number of aspects of such information, including but not limited to code changeset

106, an entity (e.g., an author or reviewer) of code changeset 106, a previous code changeset stored in repository 110 (e.g., a previous code changeset associated with a past privacy incident), an entity associated with the previous code changeset, computer code 226 (which includes code related to and/or unrelated to code changeset 106, such as other programs), and/or an entity associated with computer code 226.

In one example, the extracted feature comprises information from modification history 802, which identifies whether any code stored in code repository 110 (including computer code 226 and other code) was previously modified by any entity (e.g., individuals and/or bots), whether any code was previously modified by an author of code changeset 106 (e.g., where the author is identified in various ways, such as by obtaining information 230 associated with the code changeset), whether any code was previously modified by one or more reviewers of code changeset 106, an extent or focus of such a modification (e.g., a number of words or lines, whether the modifications are scattered across the code), the types of modifications performed, previous risk scores associated prior modifications, a date of the modification (e.g., how much time has passed since modifications were made by the author or any other entity), a frequency of prior modifications, whether the author or any other entity (including reviewers, other authors, bots, etc.) have introduced software flaws or bugs in computer code 226 or any other code contained in the repository, or any other information associated with prior modifications (e.g., additions, removals, and/or alterations) of code contained in code repository 110.

In another example, the extracted feature comprises information from previous incident history 804, which comprises data relating to prior privacy or security incidents associated with code stored in code repository 110 (including computer code 226 or any other code unrelated to code changeset 106), whether code stored in code repository contains known vulnerabilities or exploits, whether the code contains software bugs or flaws, or any other information associated with actual or potential privacy incidents with such code.

In another example, the extracted feature comprises one or more additional features 808, such as a degree indicating how tested the computer code 226 or other code stored in the repository is, how complex such code is (e.g., based on a cyclomatic complexity technique or other type of complexity measure), or various other information. These examples are only illustrative, and other types of features are described elsewhere herein.

It should be noted that any number of features can be extracted using any number of feature sources (e.g., code changeset 106, modification history 802, previous incident history 804, and/or additional features 808).

In step 804, the historical score is determined based on the feature. For instance, historical data evaluator 206 is configured to determine historical score 214 based on any one or more of features described herein. For example, where higher historical scores indicate a higher likelihood of a privacy incident occurring, historical data evaluator 206 generates a higher score where modification history 802 indicates that the author and/or a reviewer have not previously modified computer code 226 previously (and therefore, the author and/or a reviewer are inferred to be unfamiliar with the code). In another example, a higher historical score is generated where the author and/or a reviewer have previously introduced software bugs in computer code 226 or other code contained in the repository.

In some other examples, historical data evaluator 206 generates a higher historical score where previous incident history 804 indicates that computer code 226 was previously involved in a privacy or security incident. In yet another example, historical data evaluator 206 generates a higher historical score where additional features 808 indicate that computer code 226 was not well tested or has a high degree of complexity.

In another illustrative example, code changeset 106 identifies a reviewer and/or an author thereof. In such an example, historical data evaluator 206 obtains features relating to the author and/or reviewer (e.g., whether an author of the code changeset or the reviewer has previously modified code contained in code repository 110). In response to such a determination that the author or the reviewer has previously modified the data, historical data evaluator 206 determines an extent of the previous modification (if such modifications are determined to be present), and historical score 214 is generated based thereon. These examples are only illustrative, and other techniques for generating historical score 214 based on an extracted feature are contemplated.

In some further examples, a plurality of historical scores are generated. For example, a first set of historical score is generated corresponding to features associated with the author of code changeset 106, a second set of historical score is generated for a reviewer of the code changeset, a third set of historical score is generated based on features obtained from previous incident history 804, a fourth set of historical score is generated based on additional features 808, and so on. In some implementations, each score is then combined or aggregated (e.g., based on a summation, weighted average, etc.) to generate a combined historical score.

In various example embodiments, any one or more of the aforementioned features are provided to predictive model 806 for use in generating historical score 214. For instance, predictive model 806 is configured to receive features relating to modification history 802, previous incident history 804, and/or additional features 808, and output an indication representing a likelihood of a privacy incident occurrence based on the received features. In examples, utilization of predictive model 806 allows for detection of complex bug patterns that are not detectable by other methods or too complex to define via rules.

In various embodiments, predictive model 806 comprises a ML model, neural network (e.g., a deep neural network or an artificial neural network), or other artificial intelligence (AI) model. In examples, predictive model 806 is trained using information observed from previous privacy incidents, such features associated with pull requests (e.g., bug introducing pull requests) that resulted in past privacy incidents. Example algorithms that are used to select features for use in generating predictive model 806 and/or train predictive model 806 include, but are not limited to SelectKBest, ExtraTreesClassifier, Recursive Feature Elimination, Random Forest, Support Vector Machine (SVM), Logistic Regression, Naïve Bayes, linear classifiers (LCs), or any other supervised and/or unsupervised learning algorithms. In some further implementations, one or more feedback loops are provided such that risk score 108 (and associated information, such as privacy tokens present in the corresponding code changeset, historical features described herein, privacy incident occurrences associated with the changeset, etc.) may be provided to a suitable algorithm to further refine and/or train predictive model 806 to improve its accuracy.

III. Example Predictors Used to Generate a Historical Score

As discussed above, historical data evaluator 206 utilizes various predictors in generating historical score 214. Such predictors include, but are not limited to features mined from a repository (e.g., a code repository), such as features relating to a code changeset, previous code changesets, code stored in a repository, and/or entities associated with a code changeset. In various other examples, the predictors include code metrics that indicate characteristics of a set of code (e.g., code changeset 106, computer code 226, or other code stored in the repository). The following provides an illustrative list of such features and code metrics that can be used in accordance with the disclosed techniques. This list is not intended to be limiting, as other features and code metrics may also be utilized in accordance with example embodiments. In examples, historical data evaluator 206 utilizes any combination of the following predictors and/or earlier described predictors in generating historical score 214.

In various embodiments, the feature comprises information associated with characteristics of a data repository and/or an item of data (e.g., a set of computer code) stored in the repository. In one embodiment, the feature comprises information associated with a repository age, where the repository age indicates a number of days between a repository item's (e.g., a set of computer code) initial creation and the day of a current pull request (e.g., the day of the pull request or changeset that is being analyzed). In another embodiment, the feature comprises information associated with repository activity, where the repository activity indicates a number of commits in a repository item from an initial creation day until the day of the current pull request. In another embodiment, the feature comprises information associated with repository bugs, where the repository bug information identifies a number of bug fixes in a codebase (e.g., a set of computer code) from a creation of the repository item until the day of the current pull request based on the repository age and/or activity.

In other embodiments, the feature comprises information associated with characteristics of a current and/or prior code change. For instance, in one embodiment, the feature comprises an identification of the day of the current pull request (e.g., a day of the week in which a pull request is introduced for committing a changeset to a larger set of code). In another embodiment, the feature comprises information identifying a changeset size for files (e.g., a number of files changed in a current pull request). In another embodiment, the feature comprises information identifying a changeset size for lines (e.g., a size of a changeset in terms of a number of lines of code that have been added, modified, or deleted and/or a number of files or components in the changeset). In another embodiment, the feature comprises an identification of a line changed by a non-author (e.g., to determine if a line of code was introduced by a non-author of a set of code).

In another embodiment, the feature comprises a file age (e.g., a number of days between a file creation date and a date of the current pull request). In another embodiment, the feature comprises a method age (e.g., a number of days between a method creation date and a date of the current pull request). In another embodiment, the feature comprises a line age (e.g., a number of days between the creation date of a line of code that is most likely responsible for a privacy incident and a date of the current pull request). In another embodiment, the feature comprises information associated with file revisions (e.g., how often the contents of a file were modified over a certain period of time). For instance, the file revision features are generated based on how frequent a file has been changed and/or modified from a creation date until the current pull request, and/or how frequent a file has been changed and/or modified for a predetermined time period (e.g., three months). In another embodiment, the feature comprises information relating to method revisions (e.g., how often the contents of a method were modified over a certain time period of time). For instance, the method revision features are generated based on how frequent a method has been changed and/or modified from a creation date until the current pull request, and/or how frequent a method has been changed and/or modified for a predetermined time period (e.g., three months) before the current pull request. In another embodiment, the feature comprises information relating to file bug fixes (e.g., a number of previous bugs that were fixed in a file before the current pull request). In another embodiment, the feature comprises information associated with a file changeset size (e.g., a number of lines of code that have been added, modified, or deleted in a single file with multiple revisions).

In another embodiment, the feature comprise information relating to a file churn (e.g., files that are frequently modified in a certain time period). In another embodiment, the feature comprises file change times or method change times (e.g., a historical number of changes of a file or method, or other code component). In another embodiment, the feature comprises a file change period or method change period (e.g., a frequency of changes performed to a file or method, or other code component, in a given time period). In another embodiment, the feature comprises information relating to debug churns (e.g., a number of lines of code added and/or deleted to fix bugs). In another embodiment, the feature comprises information relating to a number of lines that have been added, removed, and/or modified since the file creation. In another embodiment, the feature comprises an identification of a maximum changeset size (e.g., a maximum changeset size occurred in a given period). In another embodiment, the feature comprises information relating to a file code churn (e.g., a sum of code (added lines of code minus deleted lines of code) over all revisions).

In another embodiment, the feature comprises information relating to file authors (which includes any reviewers identified by the author), including authors of a code changeset. For instance, the feature comprises information relating to a number of file authors (e.g., a number of developers who contributed to a file from creation of the file until the current pull request). In another embodiment, the feature comprises information associated with author activity (e.g., how many commits an author has made in a given time period). In another embodiment, the feature comprises information relating to an author tenure (e.g., a length of time a developer has been involved with a project or a team before the current pull request). In another embodiment, the feature comprises information relating to an author file churn or ownership file or method churn (e.g., how many files developers have touched within a project before the current pull request, how many developers have modified a file or method in a given time period). In another embodiment, the feature comprises information relating to an author line churn (e.g., how many lines of code a developer has modified within a project before the current pull request). In another embodiment, the feature comprises information relating to author bugs (e.g., how many bugs developers have fixed within a project before the current pull request). In another embodiment, the feature identifies a number of lines added, deleted, and/or modified by an author. In another embodiment, the feature identifies an author active date (e.g., a start date for an author on a project). In another embodiment, the feature identifies a number of authors (e.g., a number of developers that worked on a file or method, or other code component). In another embodiment, the feature comprises information relating to a developer familiarity or authorship (e.g., whether developers are familiar with a specific project, or whether a developer is changing a file or method that the developer did not originally author).

In another embodiment, the feature comprises information relating to a Module Activity Focus (MAF) (e.g., capturing to what extent a module receives focused attention by developers). In another embodiment, the feature comprises information relating to a Developer Attention Focus (DAF) (e.g., measuring how focused the activities of a specific developer are). In another embodiment, the feature comprises distance information (e.g., a relative "distance" between a set of modified modules). Such a distance indicates, for instance, whether a contribution of a developer working on a high number of files are closely related to each other, compared to a developer working on unrelated files).

As discussed above, historical data evaluator 206 utilizes various code metrics in generating historical score 214 in some implementations. Such code metrics include, but are not limited to data that is derived or mined from code changeset 106, computer code 226, and/or any classes related thereto. Examples of such metrics include a depth of an inheritance tree (DIT) (e.g., a number of different classes that inherit from one another all the way back to a base class), a coupling between object classes (e.g., a coupling to unique classes through parameters, local variables, return types, method calls, generic or template instantiations, base classes, interface implementations, fields defined on external types, and/or attribute decoration), lines of source code (LOSC) (e.g., an indication of an exact number of source code lines that are present in a source file, including blank lines), lines of executable code (LOEC) (e.g., an indication of an approximate number of executable code lines or operations, such as a count of a number of operations in executable code), a maintainability index (e.g., a calculation of an index value between a range, such as 0 and 100, that represents the relative ease of maintaining code), a cyclomatic complexity (e.g., a measure of a structural complexity of the code, which is created by calculating a number of different code paths in a flow of the program; a program that has a complex control flow often requires more tests to achieve good code coverage and is less maintainable), weighted methods per class (e.g., a sum of the complexity of the methods of the class), a number of children (e.g., a measure of the breadth of a class hierarchy, where a maximum DIT measures the depth), and a response for a class (e.g., a response set of a class is a set of methods that can potentially be executed in response to a message received by an object of that class, or a number of methods in the set). The foregoing examples of features and code metrics are only intended to be illustrative, and other features and/or code metrics are contemplated within the scope of the disclosure.

IV. Example Mobile Device and Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
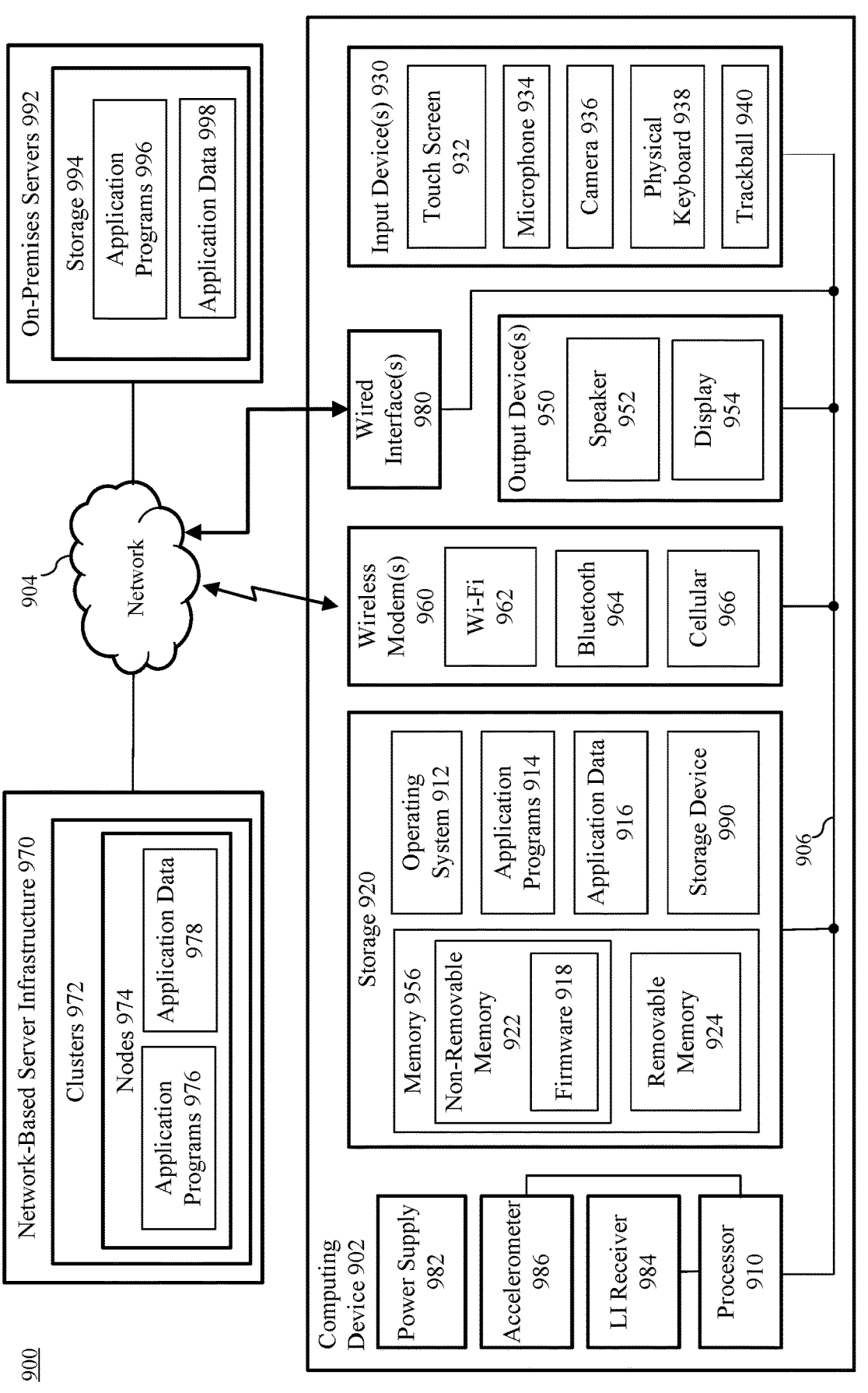
FIG. 9 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902. Computing device 902 is an example of computing device 102 and/or computing device 112, which may include one or more of the components of computing device 902. In some embodiments, computing device 902 is communicatively coupled with devices (not shown in FIG. 9) external to computing environment 900 via network 904. Network 904 comprises one or more networks such as local area networks (LANs), wide area networks (WANs), enterprise networks, the Internet, etc., and may include one or more wired and/or wireless portions. Network 904 may additionally or alternatively include a cellular network for cellular communications. Computing device 902 is described in detail as follows.

Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 930, one or more output devices 950, one or more wireless modems 960, one or more wired interfaces 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. The program code is structured to cause processor 910 to perform operations, including the processes/methods disclosed herein. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further buses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a SSD, a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing one or more of developer UI 104, privacy incidence evaluator 114, privacy incidence evaluator extension 202, keyword evaluator 204, historical data evaluator 206, supplemental evaluator 208, risk score aggregator 220, privacy risk mitigator 222, computer code 226, and/or classifier 502, along with any components and/or subcomponents thereof, as well as any other features illustrated and/or described herein, including portions thereof, and/or further examples described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 902 through one or more output devices 950. Input device(s) 930 may include one or more of touch screen 932, microphone 934, camera 936, physical keyboard 938 and/or trackball 940 and output device(s) 950 may include one or more of speaker 952 and display 954. Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi modem 962 (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 964 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 986 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present in computing environment 900 and may be communicatively coupled with computing device 902 via network 904. Server infrastructure 970, when present, may be a network-accessible server set (e.g., a cloud-based environment or platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 974. For example, as shown in FIG. 9, node 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform such as Amazon Web Services® of Amazon Web Services, Inc., or Google Cloud Platform™ of Google LLC, although these are only examples and are not intended to be limiting.

In an embodiment, computing device 902 may access application programs 976 for execution in any manner, such as by a client application and/or a browser at computing device 902. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 920 at network-based server infrastructure 970.

In some embodiments, on-premises servers 992 may be present in computing environment 900 and may be communicatively coupled with computing device 902 via network 904. On-premises servers 992, when present, are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 996 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

V. Additional Example Embodiments

A system for evaluating a privacy incident risk is disclosed herein. The system includes: a processor; and a memory device that stores program code structured to cause the processor to: retrieve a code changeset that identifies a change from a prior version of a code; determine a tokenization score indicative of a presence of a privacy term in the code changeset; determine a historical score based on a set of computer code stored in a repository; generate a privacy risk score from the tokenization score and the historical score; and perform an action based on the privacy risk score to mitigate a risk of a privacy incident occurrence.

In one implementation of the foregoing system, the action comprises one or more of: recommending a remediation action; automatically performing the recommended remediation action; or generating a notification associated with the code changeset.

In another implementation of the foregoing system, the program code is structured to cause the processor to retrieve the code changeset in a pull request that merges the code changeset with the set of computer code stored in the repository.

In another implementation of the foregoing system, the program code is structured to cause the processor to determine the historical score based on the set of computer code stored in the repository by determining whether the set of computer code has previously been associated with a privacy incident.

In another implementation of the foregoing system, the program code is structured to cause the processor to determine the tokenization score by: determining a semantic similarity between a token in the code changeset with a listing of privacy keywords; and determining that the token in the code changeset is a privacy term in response to determining that the semantic similarity has a predetermined relationship with a similarity threshold.

In another implementation of the foregoing system, the program code is structured to cause the processor to: identify a frequency of the token in the code changeset; and determine the tokenization score based on the frequency.

In another implementation of the foregoing system, the program code is structured to cause the processor to determine the historical score based on the set of computer code stored in the repository by: extracting a feature based on one of: the code changeset, an entity associated with the code changeset, a previous code changeset stored in the repository, an entity associated with the previous code changeset, the set of computer code, or an entity associated with the set of computer code; and determining the historical score based on the feature.

In another implementation of the foregoing system, the program code is structured to cause the processor to determine the historical score based on the set of computer code stored in the repository by: providing the feature to a predictive model; and determining the historical score based on an output of the predictive model.

In another implementation of the foregoing system, the code changeset identifies a reviewer thereof; and the program code is structured to cause the processor to determine the historical score based on the set of computer code stored in the repository by: determining whether an author of the code changeset or the reviewer has previously modified the set of computer code; and in response to determining that the author or the reviewer has previously modified the set of computer code, determining an extent of the previous modification.

A method for evaluating a privacy incident risk is disclosed herein. The method includes: retrieving a code changeset that identifies a change from a prior version of a code; determining a tokenization score indicative of a presence of a privacy term in the code changeset; determining a historical score based on a set of computer code stored in a repository; generating a privacy risk score from the tokenization score and the historical score; and performing an action based on the privacy risk score to mitigate a risk of a privacy incident occurrence.

In one implementation of the foregoing method, the action comprises one or more of: recommending a remediation action; automatically performing the recommended remediation action; or generating a notification associated with the code changeset.

In another implementation of the foregoing method, the method further comprises: retrieving the code changeset in a pull request that merges the code changeset with the set of computer code stored in the repository.

In another implementation of the foregoing method, the method further comprises: determining a semantic similarity between a token in the code changeset with a listing of privacy keywords; and determining that the token in the code changeset is a privacy term in response to determining that the semantic similarity has a predetermined relationship with a similarity threshold.

In another implementation of the foregoing method, the method further comprises: identifying a frequency of the token in the code changeset; and determining the tokenization score based on the frequency.

In another implementation of the foregoing method, the method further comprises: extracting a feature based on one of: the code changeset, an entity associated with the code changeset, a previous code changeset stored in the repository, an entity associated with the previous code changeset, the set of computer code, or an entity associated with the set of computer code; and determining the historical score based on the feature.

In another implementation of the foregoing method, the method further comprises: providing the feature to a predictive model; and determining the historical score based on an output of the predictive model.

In another implementation of the foregoing method, the code changeset identifies a reviewer thereof; and the method further comprises: determining whether an author of the code changeset or the reviewer has previously modified the set of computer code; and in response to determining that the author or the reviewer has previously modified the set of computer code, determining an extent of the previous modification.

A computer-readable storage medium is disclosed herein. The computer-readable storage medium has computer program code recorded thereon that when executed by at least one processor causes the at least one processor to perform a method comprising: retrieving a code changeset that identifies a change from a prior version of a code; determining a tokenization score indicative of a presence of a privacy term in the code changeset; determining a historical score databased on a set of computer code stored in a repository; generating a privacy risk score from the tokenization score and the historical score; and performing an action based on the privacy risk score to mitigate a risk of a privacy incident occurrence.

In one implementation of the foregoing computer-readable storage medium, the action comprises one or more of: recommending a remediation action; automatically performing the recommended remediation action; or generating a notification associated with the code changeset.

In another implementation of the foregoing computer-readable storage medium, the method further comprises: determining a semantic similarity between a token in the code changeset with a listing of privacy keywords; and determining that the token in the code changeset is a privacy term in response to determining that the semantic similarity has a predetermined relationship with a similarity threshold.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A system for evaluating a privacy incident risk, the system comprising:
   a processor; and
   a memory device that stores program code structured to cause the processor to:

retrieve a code changeset that identifies a change from a prior version of a code;

determine a tokenization score indicative of a presence of a privacy term in the code changeset by:

applying a language model to a token in the code changeset to generate an embedding of the token, and determining a semantic similarity between the token and the privacy term based on a similarity between the embedding of the token and an embedding of the privacy term generated by applying the language model to the privacy term;

determine a historical score based on a set of computer code stored in a repository;

generate a privacy risk score from the tokenization score and the historical score; and perform an action based on the privacy risk score to mitigate a risk of a privacy incident occurrence.

2. The system of claim 1, wherein the action comprises one or more of:

recommending a remediation action;

automatically performing the recommended remediation action; or generating a notification associated with the code changeset.

3. The system of claim 1, wherein the program code is structured to cause the processor to retrieve the code changeset in a pull request that merges the code changeset with the set of computer code stored in the repository.

4. The system of claim 1, wherein the program code is structured to cause the processor to determine the historical score based on the set of computer code stored in the repository by:

determining whether the set of computer code has previously been associated with a privacy incident.

5. The system of claim 1, wherein the program code is structured to cause the processor to determine the tokenization score by:

determining that the privacy term is present in the code changeset in response to determining that the semantic similarity has a predetermined relationship with a similarity threshold.

6. The system of claim 5, wherein the program code is structured to cause the processor to:

identify a frequency of the token in the code changeset; and determine the tokenization score based on the frequency.

7. The system of claim 1, wherein the program code is structured to cause the processor to determine the historical score based on the set of computer code stored in the repository by:

extracting a feature based on one of:

the code changeset, an entity associated with the code changeset, a previous code changeset stored in the repository, an entity associated with the previous code changeset, the set of computer code, or an entity associated with the set of computer code; and determining the historical score based on the feature.

8. The system of claim 7, wherein the program code is structured to cause the processor to determine the historical score based on the set of computer code stored in the repository by:

providing the feature to a predictive model; and determining the historical score based on an output of the predictive model.

9. The system of claim 1, wherein the code changeset identifies a reviewer thereof; and wherein the program code is structured to cause the processor to determine the historical score based on the set of computer code stored in the repository by:

determining whether an author of the code changeset or the reviewer has previously modified the set of computer code; and in response to determining that the author or the reviewer has previously modified the set of computer code, determining an extent of the previous modification.

10. A method for evaluating a privacy incident risk, comprising:

retrieving a code changeset that identifies a change from a prior version of a code;

determining a tokenization score indicative of a presence of a privacy term in the code changeset by:

applying a language model to a token in the code changeset to generate an embedding of the token, and determining a semantic similarity between the token and the privacy term based on a similarity between the embedding of the token and an embedding of the privacy term generated by applying the language model to the privacy term;

determining a historical score based on a set of computer code stored in a repository;

generating a privacy risk score from the tokenization score and the historical score; and performing an action based on the privacy risk score to mitigate a risk of a privacy incident occurrence.

11. The method of claim 10, wherein the action comprises one or more of:

recommending a remediation action;

automatically performing the recommended remediation action; or generating a notification associated with the code changeset.

12. The method of claim 10, further comprising:

retrieving the code changeset in a pull request that merges the code changeset with the set of computer code stored in the repository.

13. The method of claim 10, further comprising:

determining that the privacy term is present in the code changeset in response to determining that the semantic similarity has a predetermined relationship with a similarity threshold.

14. The method of claim 13, further comprising:

identifying a frequency of the token in the code changeset; and determining the tokenization score based on the frequency.

15. The method of claim 10, further comprising:

extracting a feature based on one of:

the code changeset, an entity associated with the code changeset, a previous code changeset stored in the repository, an entity associated with the previous code changeset, the set of computer code, or an entity associated with the set of computer code; and determining the historical score based on the feature.

16. The method of claim 15, further comprising:

providing the feature to a predictive model; and determining the historical score based on an output of the predictive model.

17. The method of claim 10, wherein the code changeset identifies a reviewer thereof; and wherein the method further comprises:

determining whether an author of the code changeset or the reviewer has previously modified the set of computer code; and in response to determining that the author or the reviewer has previously modified the set of computer code, determining an extent of the previous modification.

18. A computer-readable storage medium having computer program code recorded thereon that when executed by at least one processor causes the at least one processor to perform a method comprising:

retrieving a code changeset that identifies a change from a prior version of a code;

determining a tokenization score indicative of a presence of a privacy term in the code changeset by:

applying a language model to a token in the code changeset to generate an embedding of the token, and determining a semantic similarity between the token and the privacy term based on a similarity between the embedding of the token and an embedding of the privacy term generated by applying the language model to the privacy term;

determining a historical score based on a set of computer code stored in a repository;

generating a privacy risk score from the tokenization score and the historical score; and performing an action based on the privacy risk score to mitigate a risk of a privacy incident occurrence.

19. The computer-readable storage medium of claim 18, wherein the action comprises one or more of:

recommending a remediation action;

automatically performing the recommended remediation action; or generating a notification associated with the code changeset.

20. The computer-readable storage medium of claim 18, wherein the method further comprises:

determining that the privacy term is present in the code changeset in response to determining that the semantic similarity has a predetermined relationship with a similarity threshold.

\* \* \* \* \*